United States Patent
Hollander

(10) Patent No.: US 10,239,235 B2
(45) Date of Patent: Mar. 26, 2019

(54) SYSTEMS FOR THREE-DIMENSIONAL WEAVING OF COMPOSITE PREFORMS AND PRODUCTS WITH VARYING CROSS-SECTIONAL TOPOLOGY

(71) Applicant: Jonathan Marc Hollander, San Francisco, CA (US)

(72) Inventor: Jonathan Marc Hollander, San Francisco, CA (US)

(73) Assignee: SERIFORGE INC., San Francisco, CA (US)

(*) Notice: Subject to any disclaimer, the term of this patent is extended or adjusted under 35 U.S.C. 154(b) by 220 days.

(21) Appl. No.: 15/346,701

(22) Filed: Nov. 8, 2016

(65) Prior Publication Data
US 2017/0050340 A1 Feb. 23, 2017

Related U.S. Application Data

(63) Continuation of application No. 14/216,472, filed on Mar. 17, 2014, now Pat. No. 9,527,248.
(Continued)

(51) Int. Cl.
*B29B 11/00* (2006.01)
*B29C 65/00* (2006.01)
(Continued)

(52) U.S. Cl.
CPC ............ *B29B 11/16* (2013.01); *B29C 64/141* (2017.08); *B29C 64/147* (2017.08); *B29C 65/62* (2013.01);
(Continued)

(58) Field of Classification Search
CPC ......... B29C 67/00; B29C 70/24; B29C 70/54; B29C 70/30; B29C 70/545; B29C 67/0074; B33Y 10/00; B33Y 30/00; B29B 11/16
See application file for complete search history.

(56) References Cited

U.S. PATENT DOCUMENTS 4,038,440 A 7/1977 King
4,528,051 A 7/1985 Heinze et al.
(Continued)

FOREIGN PATENT DOCUMENTS

WO 2013149284 A1 10/2013

OTHER PUBLICATIONS

Behera and Mishra, 3-Dimensional Weaving, Indian Journal of Fibre & Textile Research, vol. 33, Sep. 2008, pp. 274-287.
(Continued)

*Primary Examiner* — Linda L Gray
(74) *Attorney, Agent, or Firm* — Trellis IP Law Group, PC

(57) ABSTRACT

A system fabricating composite preforms includes a layer assembly stage with a first stage for receiving new layers, such as layer N; and a second stage for holding up to K layers, such as layers N−1 to N−K. An interlayer reinforcement insertion mechanism inserts interlayer reinforcements Q through layer N and the layers N−1 to N−K, using a first layer spacing between layer N−K and layer N−K−1 in a completed layer stage. Following the interlayer reinforcements Q insertion, the layer assembly stage transfers the layer N−K to the completed layer stage; closes the first layer spacing, bringing layers N−K and N−K−1 into contact; and transfers the layer N to the second stage. The system repeats this cycle of receiving new layers, inserting interlayer reinforcements using layer spacings between the second and completed layer stages, closing these layer spacings, and transferring layers to construct composite preforms with arbitrary numbers of layers.

8 Claims, 19 Drawing Sheets

Related U.S. Application Data

(60) Provisional application No. 61/788,493, filed on Mar. 15, 2013.

(51) Int. Cl.

| | | |
|---|---|---|
| *B29C 70/00* | (2006.01) |
| *B33Y 10/00* | (2015.01) |
| *B33Y 30/00* | (2015.01) |
| *B29C 64/00* | (2017.01) |
| *B29B 11/16* | (2006.01) |
| *B29C 65/62* | (2006.01) |
| *B29C 70/54* | (2006.01) |
| *B29C 70/24* | (2006.01) |
| *B29C 70/30* | (2006.01) |
| *B29C 64/141* | (2017.01) |
| *B29C 64/147* | (2017.01) |
| *B29K 29/00* | (2006.01) |
| *B29K 105/08* | (2006.01) |
| *B29K 307/04* | (2006.01) |

(52) U.S. Cl.
CPC ............. *B29C 70/24* (2013.01); *B29C 70/30* (2013.01); *B29C 70/543* (2013.01); *B29C 70/545* (2013.01); *B33Y 10/00* (2014.12); *B33Y 30/00* (2014.12); *B29K 2029/04* (2013.01); *B29K 2105/089* (2013.01); *B29K 2307/04* (2013.01); *Y10T 156/1074* (2015.01); *Y10T 156/1075* (2015.01); *Y10T 156/1093* (2015.01); *Y10T 156/13* (2015.01); *Y10T 156/1322* (2015.01)

(56) References Cited

U.S. PATENT DOCUMENTS

| | | |
|---|---|---|
| 4,752,352 A | 6/1988 | Feygin |
| 4,774,120 A | 9/1988 | Vess |
| 4,808,461 A | 2/1989 | Boyce et al. |
| 4,842,787 A | 6/1989 | Chess |
| 4,867,086 A | 9/1989 | Vees |
| 4,992,317 A | 2/1991 | Chess |
| 5,021,283 A | 6/1991 | Takenaka et al. |
| 5,024,862 A | 6/1991 | Frank |
| 5,733,404 A | 3/1998 | Freitas et al. |
| 5,968,639 A | 10/1999 | Childress |
| 6,315,007 B1 | 11/2001 | Mohamed et al. |
| 6,338,367 B1 | 1/2002 | Khokar |
| 6,431,222 B1 | 8/2002 | Khokar |
| 6,645,333 B2 | 11/2003 | Johnson et al. |
| 6,742,547 B2 | 6/2004 | Bryn et al. |
| 7,409,757 B2 | 8/2008 | Hall et al. |
| 7,836,917 B1 | 11/2010 | Osborne |
| 2004/0219855 A1 | 11/2004 | Tsotsis |
| 2008/0193709 A1 | 8/2008 | Han |
| 2008/0274326 A1 | 11/2008 | Kim et al. |
| 2013/0171431 A1 | 7/2013 | Swartz et al. |

OTHER PUBLICATIONS

First World Conference on 3D Fabrics, Weston Conference Centre, University of Manchester, Apr. 10-11, 2008.
Kadir Bilisik, Multiaxis Three Dimensional (3D) Woven Fabric, Advances in Modern Woven Fabrics Technology, Dr. Savvas Vassiliadis (Ed.), ISBN: 978-953-307-337-8, InTech, Jul. 27, 2011. L. Tong et al., 3D Fibre Reinforced Polymer Composites, Chapters 1-2, 2002.
M. McClaine, Overview of Recent Developments in 3D Structures, Albany Engineered Composites, 2012.
Peggy Malnati, Rapid layup: New 3-D preform technology, Composites World, Sep. 2012.
International Search Report and Written Opinion of PCT Application No. PCT/US2014/030480 dated Aug. 11, 2014.

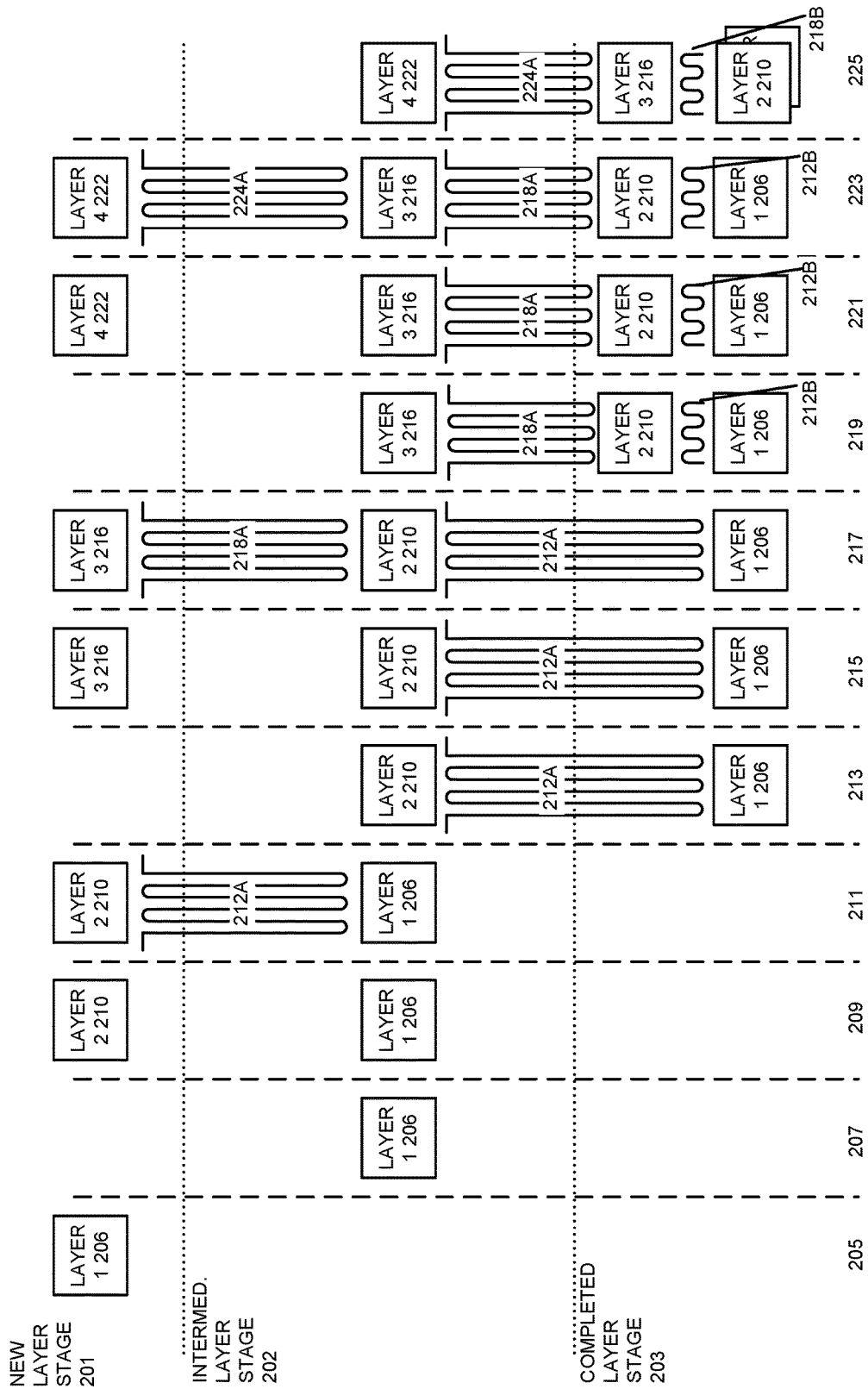

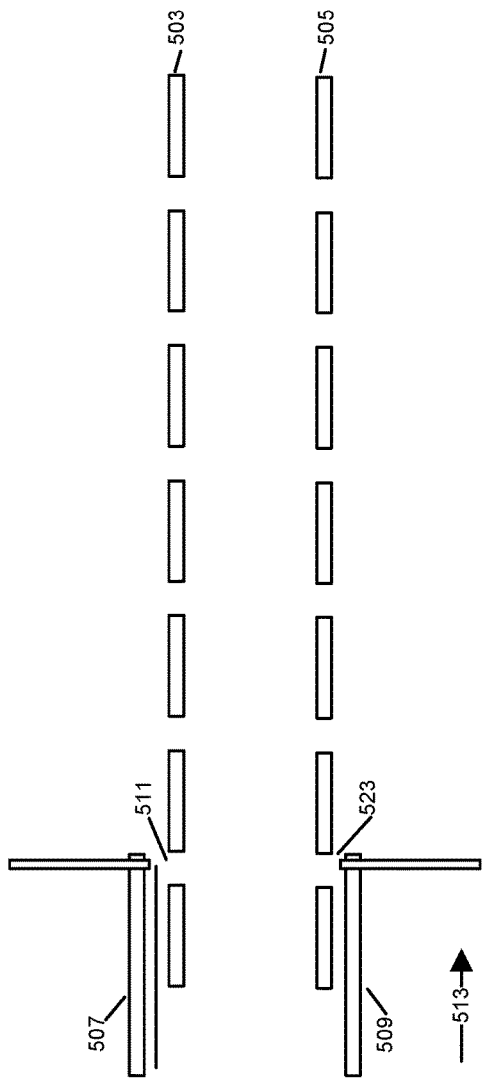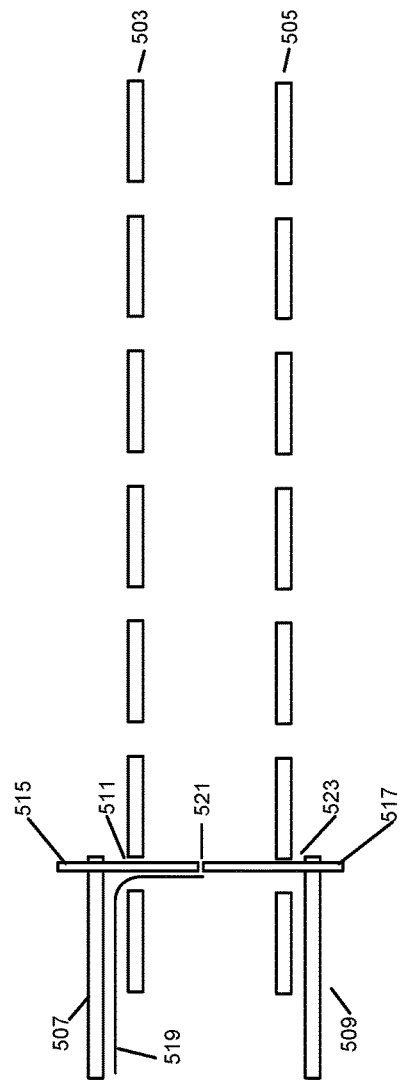
FIG. 5A
FIG. 5B

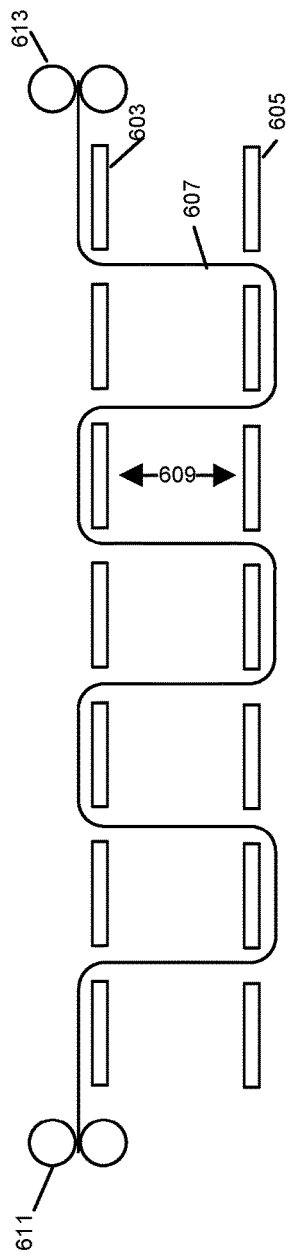
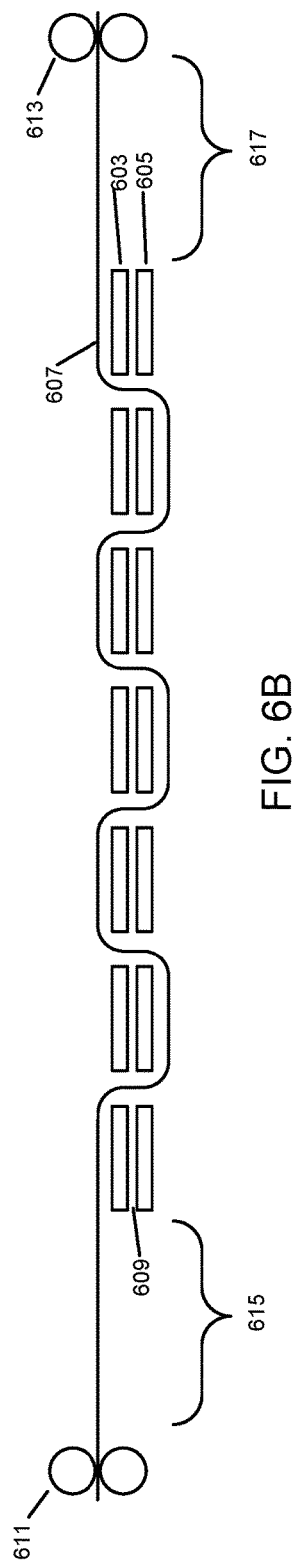
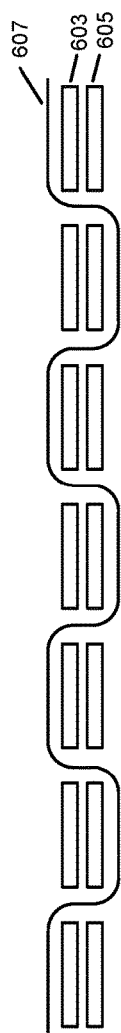
FIG. 6A
FIG. 6B
FIG. 6C

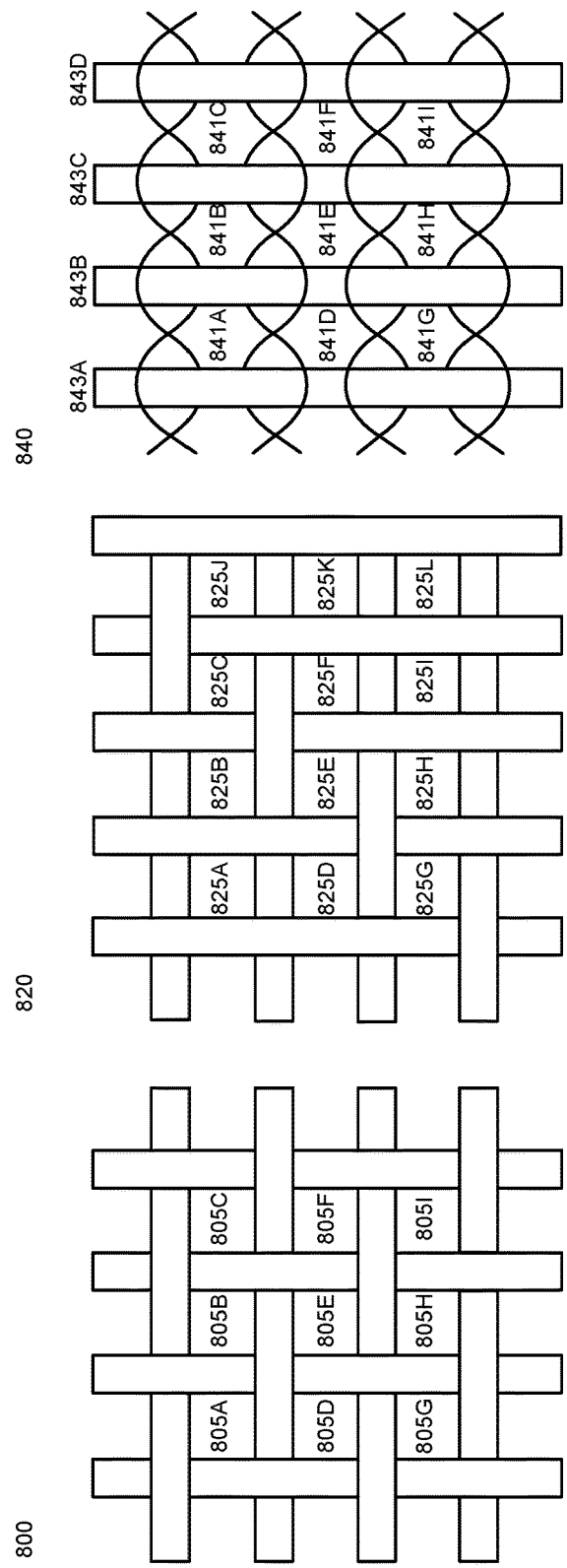

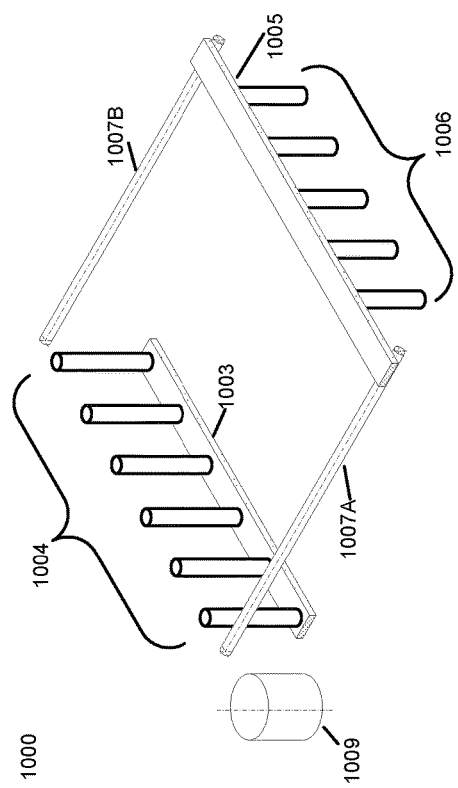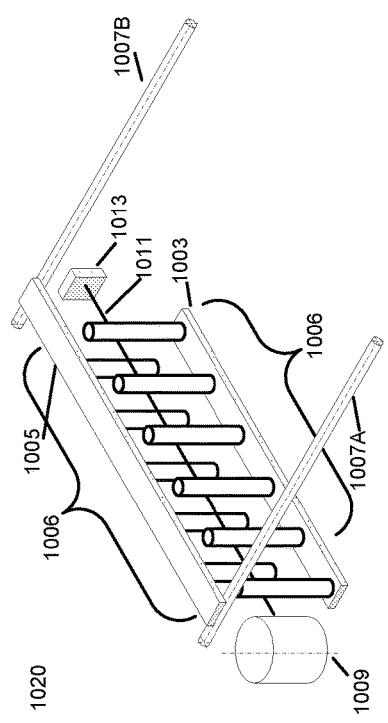
FIG. 10A
FIG. 10B

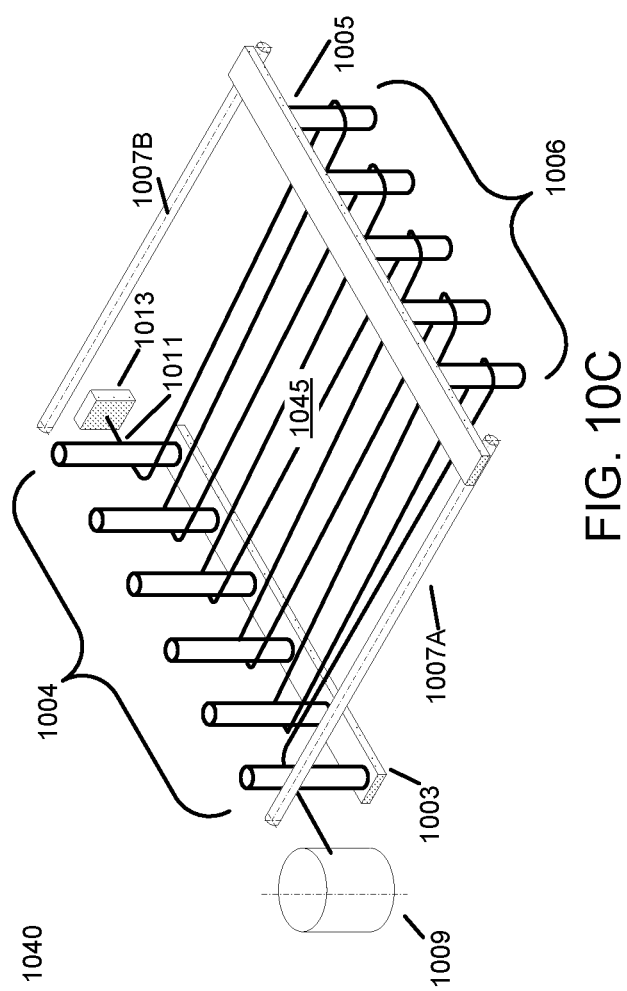

SYSTEMS FOR THREE-DIMENSIONAL WEAVING OF COMPOSITE PREFORMS AND PRODUCTS WITH VARYING CROSS-SECTIONAL TOPOLOGY

CROSS-REFERENCES TO RELATED APPLICATIONS

This application is a continuation of U.S. patent application Ser. No. 14/216,472, filed Mar. 17, 2014 entitled SYSTEMS FOR THREE-DIMENSIONAL WEAVING OF COMPOSITE PREFORMS AND PRODUCTS WITH VARYING CROSS-SECTIONAL TOPOLOGY which claims priority to U.S. Provisional Patent Application No. 61/788,493, filed Mar. 15, 2013 entitled SYSTEM AND METHOD FOR THREE-DIMENSIONAL WEAVING OF COMPOSITE PREFORMS AND PRODUCTS WITH VARYING CROSS-SECTIONAL TOPOLOGY which are hereby incorporated by reference as if set forth in full in this application for all purposes.

BACKGROUND OF THE INVENTION

The present invention relates to the field of fiber-reinforced composite materials, and in particular to methods and devices for manufacturing fiber preforms and finished composite products with complicated three-dimensional shapes. Fiber-reinforced composite materials, referred to herein as composites, are materials comprised of fibers embedded in a matrix material. Typical fibers include but are not limited to glass fibers, carbon fibers (e.g. graphite fibers and/or more exotic forms of carbon, such as carbon nanotubes), ceramic fibers, and synthetic polymer fibers, such as aramid and ultra-high-molecular-weight polyethylene fibers. Typical matrix materials include but are not limited to polymers, such as epoxies, vinylesters, polyester thermosetting plastics, and phenol formaldehyde resins; cement and concrete; metals; and ceramics.

Composite materials often combine high-strength and relatively light weight. In typical composite products, the fibers provide high tensile strength in one or more directions and the matrix material hold the fibers in a specific shape. A set of fibers roughly in the shape of a final product is referred to as a fiber preform. Typical prior fiber preforms are comprised of layers of fibers (often woven or bound into a sheet of fabric) that are cut and arranged into a desired shape. Because fibers and fabrics made from fibers only provide high strength in specific directions, multiple layers of fiber cloth are often stacked in different orientations to provide strength and stiffness optimized for the intended usage of the final product.

Most prior composite manufacturing techniques require the production of a mold, mandrel, plug, or other rigid structure in the shape of the desired preform. Sheets of fiber fabric are then cut and arranged on this rigid structure. A matrix material, such as uncured polymer resin, may be embedded in the fiber fabric or applied to the fabric during or after the fabric layup process. The matrix material is then cured or hardened, often under elevated temperature and/or pressure differentials to ensure even distribution of the matrix material and prevent voids, air bubbles, or other internal defects. Pressure and/or temperature may be applied to the composite part during curing using techniques including but not limited to compression molding, vacuum bags, autoclaves, inflatable bladders, and/or curing ovens.

Unfortunately, prior techniques for manufacturing fiber preforms and final composite parts, especially for complex part shapes, are time-consuming and difficult to automate. For example, creating a mold, mandrel, or other rigid structure for supporting the preform is costly and time-consuming, especially for custom parts or small production runs where the tooling cost and time cannot be amortized over a large number of parts. In addition, the cutting and/or arranging fabric in the mold or other rigid structure is often performed by hand, due to the difficulty in draping fabric over complex forms without wrinkles or other surface defects. As a result, composite products are much more expensive than equivalent products made using conventional materials.

BRIEF DESCRIPTION OF THE DRAWINGS

The invention will be described with reference to the drawings, in which:

FIG. 2 illustrates an example progression of layers through the stages of a system for three-dimensional weaving of composite preforms and products with varying cross-sectional topology according to an embodiment of the invention;

FIGS. 5A-5G illustrates the operation of an example mechanism for connecting two or more two-dimensional layers of fibers with an interlayer fibers to form a three-dimensional weave according to an embodiment of the invention;

FIGS. 6A-6C illustrate the operation of an example mechanism for consolidating two or more layers of a three-dimensional weave according to an embodiment of the invention;

FIGS. 8A-8C illustrate example open weave fabric patterns suitable for use with embodiments of the invention;

FIGS. 10A-10D illustrate an example mechanism for supporting and moving layers of fabric during three-dimensional weaving according to an embodiment of the invention.

SUMMARY

Embodiments of the invention includes a system for fabricating composite objects including a composite preform. The system includes a layer assembly stage including a first stage adapted to receive new material layers, such as a new material layer N; and a second stage adapted to hold up to K material layers, where K is a positive integer, such as one or more material layers N−1 to N−K. An embodiment of the invention includes an interlayer reinforcement insertion mechanism adapted to insert an interlayer reinforcement set Q through the material layer in the first stage, for example material layer N, and the one or more material layers located in the second stage of the layer assembly stage, for example material layers N−1 to N−K.

In an embodiment, the interlayer reinforcement insertion mechanism is adapted to manipulate the interlayer reinforcement set Q within a first layer spacing between the oldest or last material layer in the second stage, such as material layer N−K, and the newest or first material layer in a completed layer stage, such as a material layer N−K−1. Following the insertion of the interlayer reinforcement set Q, the layer assembly stage transfers the material layer N−K to the completed layer stage and closes the first layer spacing to bring the material layers N−K and N−K−1 into contact. The layer assembly stage may then transfer the material layer in the first stage, such as material layer N, to the second stage. Embodiments of the system repeat this cycle of receiving new material layers, inserting interlayer reinforcement sets using additional layer spacings between the second stage and the completed layer stage, and then closing these layer spacings and transferring material layers to construct composite preforms with any arbitrary number of material layers.

DETAILED DESCRIPTION

Embodiments of the invention include a system and method for created a composite preform with fibers and optionally other reinforcements interconnected through a three-dimensional weaving pattern. Embodiments of the invention create composite preforms by stacking layers of two-dimensional fiber fabric and then connecting two or more layers of fabric with interlayer fibers. Each layer of fabric may have a different shape than the other layers and any arbitrary topology, potentially including non-convex and/or disjoint shapes.

Furthermore, embodiments of the invention may produce composite preforms comprised of any arbitrary number of interconnected layers. Further embodiments of the invention may cure composite preforms to produce completed composite parts.

Figure 1A:
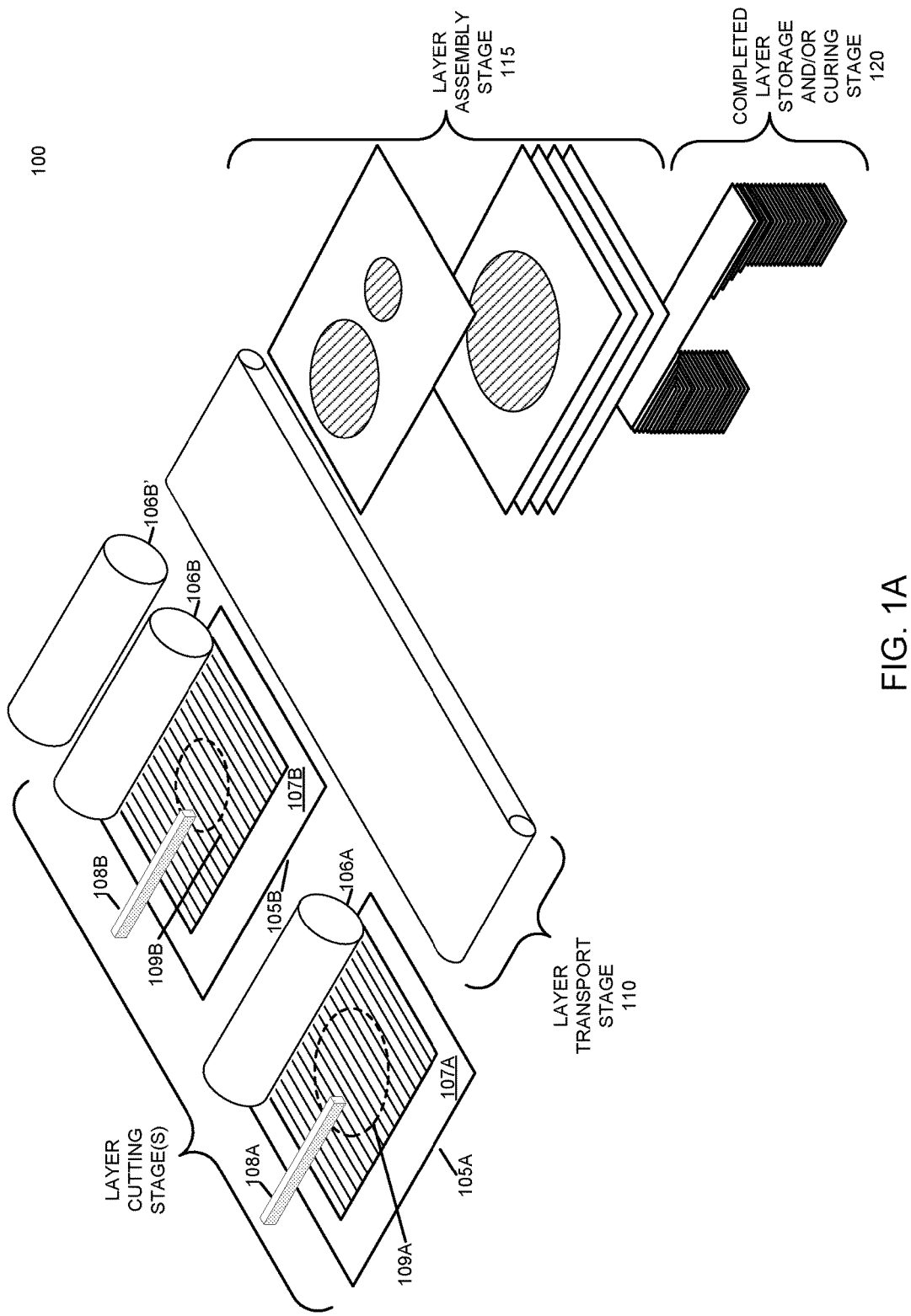
FIGS. 1A-1B illustrate an example arrangement of the stages of a system for three-dimensional weaving of composite preforms and products with varying cross-sectional topology according to an embodiment of the invention.
Figure 1B:
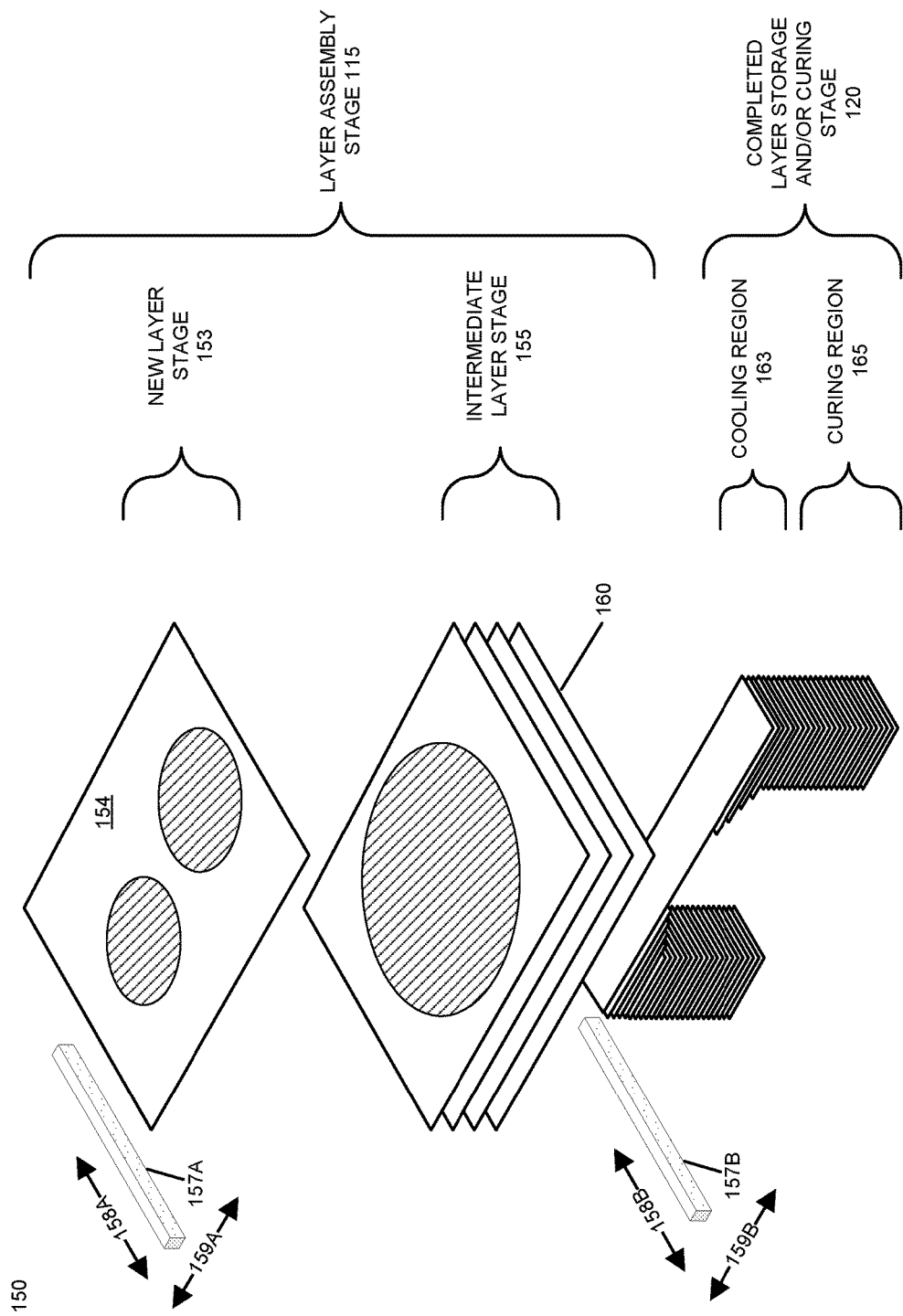

FIGS. 1A-1B illustrate an example arrangement of the stages of a system for three-dimensional weaving of composite preforms and products with varying cross-sectional topology according to an embodiment of the invention. FIG. 1A illustrates a system 100 including one or more layer cutting stages, such as layer cutting stages 105A and 105B; a layer transport stage 110; a layer assembly stage 115; and a completed layer storage and/or curing stage 120.

In summary of system 100, one or more layer cutting stages cut bulk fabric and optionally other materials into the shapes of cross-sections of the desired fiber preform. The layer transport stage 110 collects cut cross-section shapes from each of the layer cutting stages and transports them to the layer assembly stage 115. Layer assembly stage 115 stacks cut cross-section shapes in the correct order and then joins two or more layers of cross-section shapes using interlayer weaving, as described in detail below. After the interlayer weaving process is complete for a given subset of cross-section shapes, they become part of a stack of interwoven fabric layers forming a completed section of the fiber preform and are stored in the completed layer storage stage 120.

Layer cutting stage 105A includes a mechanism for dispensing bulk fabric, for example from a bolt or roll of fabric 106A, over a cutting area 107A. Bulk fabric may include any type of fibers known in the art for use with composite materials. Bulk fabric may be woven or non-woven fabric and may include different types of fibers, such as carbon fibers arranged parallel to one axis and aramid or other fibers arranged parallel to another axis. As described in detail below, embodiments of the bulk fabric is woven or otherwise assembled with gaps or holes between fibers to allow passage of interlayer fibers. Although referred to as a "layer," each cross-section shape may be comprised of two or more physical layers of fabric, potentially bonded together, that are cut and manipulated as a unit, such as a multilayer fabric or sublaminate.

A cutting head 108A moves over the cutting area 107A to cut one or more cross-section shapes 109A from the bulk fabric. Cutting head 108A may use any type of cutting mechanism known in the art and suited to cut the fibers included in the bulk fabric, including one or more static or moving blades, cutting lasers, and waterjet cutters.

Each of the cross-section shapes 109A corresponds with the shape of all or a portion of a cross-section of the desired fiber preform. As described above, the cross-section shapes may have any arbitrary topology and include non-convex and/or disjoint shapes. Furthermore, cross-section shapes associated with different layers may have different alignments with respect to the fiber orientation of the bulk fabric, so that as different layers of cross-section shapes are stacked, cross-section shapes may have fiber orientations in different directions.

An embodiment of system 100 includes only a single layer cutting stage 105A. Further embodiments of the invention include one or more additional layer cutting stages with similar components, such as layer cutting stage 105B. Each of the optional additional layer cutting stages include similar components, including bulk fabric 106B, cutting area 107B, and cutting head 108B to cut one or more cross-section shapes 109B. Embodiments of the invention may include any arbitrary quantity of layer cutting stages operating in parallel to increase the overall speed of system 100.

In yet another embodiment, system 100 may utilize cross-section shapes cut from different materials. In one implementation, the set of layer cutting stages may be partitioned into two or more subsets, with each subset of layer cutting stages having a different type of bulk fabric material to cut. In another implementation, all or a portion of the layer cutting stages may include two or more rolls of different bulk fabric material and a mechanism for selecting one of the materials to cut. For example, layer cutting stage 105B may include material roll 106B and optionally roll 106B'.

In still a further embodiment, materials without fibers may also be included for cutting and incorporation into a fiber preform to support fiber layers during fabrication or to add functional characteristics to the final composite part. For example, a plastic film, such as water-soluble polyvinyl alcohol film, may be included in one or more layers of the fiber preform as a support structure for layers to be added on top of the support layers. After the fiber preform is cured, water or steam may be used to remove these support layers. Other non-fiber materials for cutting and eventual inclusion in layers may include electrically conductive and/or insulating materials; metal foils; magnetic materials; materials adapted to be removed by heat, solvents, or acid; and flexible materials.

After one or more cross-section shapes for a layer have been cut from the bulk fabric by one of the cutting stages, the layer transport stage 110 moves the cross-section shapes to an initial position in the layer assembly stage 115. In an embodiment, layer transport stage 110 includes a conveyor system for transporting cross-section shapes. In another embodiment, a mechanical arm or gantry with one or more degrees of freedom may be used to transport cross-section shapes.

In an embodiment, layer transport stage includes a movable vacuum table platform for picking up cross-section shapes from one or more layer cutting stages and moving these shapes to the layer assembly stage 115.

If the cross-section shapes do not have any interior voids or openings, then any excess fabric leftover after cutting will remain attached to the roll of bulk fabric. This allows the cross-section shapes to be easily removed from the cutting stage. For more complicated fiber preforms having cross-section shapes with interior voids, embodiments of the layer transport stage 110 may include a vacuum table or gripper with selectable regions so that cut fabric corresponding with cross-section shapes may be picked up. In this implementation, pieces of cut fabric corresponding with interior voids are left behind in the cutting area and may be swept away.

In still another embodiment, a moveable plate or drum with an electrostatic charge may be used to pick up cross-section shapes. In yet a further embodiment, a photoconductive plate or drum may be given a substantially uniform electrostatic charge and then exposed to a pattern of light corresponding with the inverse of the cross-section shape. The pattern of light causes the electrostatic charge to dissipate outside areas of the plate or drum corresponding with the cross-section shape. The selectively-charged plate or drum may then be used to pick up the cross-section shape while leaving behind unneeded pieces of cut fabric, such as pieces corresponding with interior voids.

FIG. 1B illustrates a detail view 150 of the layer assembly stage 115 and completed layer storage and/or curing stage 120. As shown in detail view 150, the layer assembly stage 115 includes a new layer stage 153 and an intermediate layer stage 155. New layer stage 153 receives new cross-section shapes 154 from the layer transport stage 110 shown in FIG. 1A. Intermediate layer stage 115 holds at least one and optionally more than one layer. The layer assembly stage 115 uses a three-dimensional weaving technique to connect the new cross-section shapes 154 in new layer stage 153 with the one or more layers of previously received cross-section shapes in intermediate layer stage 155 using interlayer fibers. As described in detail below, after the new cross-section shapes 154 in the new layer stage 153 are connected with the cross-section shapes in the intermediate layer stage, the new cross-section shapes 154 are transferred from the new layer stage 153 to the top of the intermediate layer stage 155. Additionally, the bottom-most layer of cross-section shapes 160 in the intermediate layer stage 155 is transferred to the completed layer storage stage 120.

To connect the cross-section shapes 154 in new layer stage 153 with the cross-section shapes in the intermediate layer stage 155, an embodiment of the layer assembly stage 115 includes one or more pairs of interlayer weaving arms, such as interlayer weaving arm pair 157 comprised of upper interlayer weaving arm 157A and lower interlayer weaving arm 157B. Upper interlayer weaving arm 157A is adapted to move over the top of new layers in new layer stage 153 in directions 158A and 159A. Similarly, lower interlayer weaving arm 157B moves underneath the stack of cross-section shapes in the intermediate layer stage 155 and over the completed layer storage stage 120 in directions 158B and 159B. During the interlayer weaving process, the upper and lower interlayer weaving arms 157A and 157B move generally in unison to pass interlayer fibers through the cross-section shapes of the new layer stage 153 and intermediate layer stage 155.

In an embodiment, completed portions of the fiber preform are stored in the completed layer storage stage 120. In a further embodiment, resin or other matrix material may be included in the bulk fabric or added to the layers of cross-section shapes during the layer cutting 105, layer transport 110, and/or layer assembly stages 115. In an embodiment, the completed layer storage stage 120 may optionally include a cooling region 163 including a refrigeration or other type of cooling system to prevent resin in the preform from cooling prematurely.

In yet a further embodiment, matrix material included in the fiber preform may optionally be cured or otherwise processed to produce a final product within the completed layer stage 120. In one implementation of this embodiment, all or a portion of the completed layer stage is heated to accelerate a matrix curing process. In another implementation, the completed layer storage stage 120 includes a curing region 165 that selectively cures portions of the fiber preform as it moves through this region. The curing region 165 may include a continuous oven with one or more elevated temperature zones or any other type of curing system known in the art. In this embodiment, the rate of layer cutting and assembling is calibrated so that as new layers are added to the completed layer storage stage 120, the completed portions of the fiber preform move through the curing region 165 at a rate appropriate for curing the matrix material.

As discussed above, layers of fiber cloth, which have been cut into cross-section shapes, progress through the layer assembly stage where they are connected with each other using interlayer fibers. FIG. 2 illustrates an example 200 of a progression of layers through the stages of a system for three-dimensional weaving of composite preforms and products with varying cross-sectional topology according to an embodiment of the invention.

Example 200 begins with phase 205. In phase 205, a new layer, layer 1 206, is added to the new layer stage 201. Intermediate stage 202 and completed layer stage 203 are empty in phase 205. Because there are no layers below layer 1 206 for weaving with interlayer fibers, phase 207 moves layer 1 206 to the intermediate layer stage 202.

Phase 209 adds layer 2 210 to the new layer stage 201. As discussed above, each layer may be comprised of one or more cross-section shapes cut from one or more fiber fabrics. Furthermore, layer's cross-section shapes may include different shapes, different shape topologies, and different fiber orientations than those of the other layers.

Phase 211 weaves interlayer fibers 212A between layer 2 210 and layer 1 206. As described in detail below, an upper interlayer weaving arm passes above layer 2 210 and a lower interlayer weaving arm passes below layer 1 206 to weave these two layers together with interlayer fibers. The two interlayer weaving arms pass individual fibers or untwisted bundles of fibers (sometimes referred to as tows) through layers 206 and 210. In an embodiment, the bulk fabric used to create the cross-section shapes is woven or otherwise assembled with gaps or holes between fibers to allow passage of interlayer fibers. In a further embodiment, cross-section shapes are cut and placed in the layer assembly stage so that the gaps in adjacent fabric layers are aligned.

In prior, two-dimensional weaving techniques, the fibers inserted during the weaving process (sometimes referred to as weft fibers) are normally pulled taut to bind the other fibers (sometimes referred to as warp fibers) together. In contrast, in the embodiment illustrated by example 200, the interlayer fibers 212A are not pulled taut at this phase so that there is sufficient space for the lower interlayer weaving arm to pass between the layers in a later phase.

Following the weaving of interlayer fibers 212A in phase 211, phase 213 transfers layer 2 210 to the intermediate layer stage 202 and layer 1 206 to the completed layer stage 203. In an embodiment, phase 213 may transfer these layers simultaneously so as to maintain the length and tension of interlayer fibers 212A.

Phase 215 adds layer 3 216 to the new layer stage 201 in a manner similar to phases 205 and 209. Phase 217 weaves interlayer fibers 218A between layer 3 216 and layer 2 210 in a manner similar to phase 211. An upper interlayer weaving arm passes above layer 3 216 and a lower interlayer weaving arm passes below layer 2 210 to weave these two layers together with interlayer fibers. Because of the spacing left between layers 1 206 and 2 210 in the earlier interlayer weaving phase 211, there is sufficient space for the lower interlayer weaving arm to pass between layers 1 206 and 2 210 to weave interlayer fibers 218A between layers 3 216 and 2 210.

Following the weaving of interlayer fibers 218A in phase 217, phase 219 transfers layer 3 216 to the intermediate layer stage 202 and layer 2 210 to the completed layer stage 203. In an embodiment, phase 219 may transfer these layers simultaneously so as to maintain the length and tension of interlayer fibers 218A. Additionally, because the completed layer stage 203 already contains layer 1 206, phase 219 now tightens interlayer fibers 212A to form tightened interlayer fibers 212B. This process of tightening interlayer fibers 212A brings layers 1 206 and 2 210 into contact with each other, eliminating the space previously left between these layers for the lower interlayer weaving arm. This process of tightening a set of interlayer fibers between two layers to bring the layers into contact is referred to as layer consolidation. It should be noted that the interlayer fibers 218A are not substantially affected by the tightening of interlayer fibers 212A and there is still sufficient space between layers 2 210 and 3 216 to allow for the passage of the lower interlayer weaving arm.

Phase 221 adds layer 4 222 to the new layer stage 201 in a manner similar to phases 205, 209, and 215. Phase 223 weaves interlayer fibers 224A between layer 4 222 and layer 3 216 in a manner similar to phases 211 and 217. Because of the spacing left between layers 2 210 and 3 216 in the earlier interlayer weaving phase 217, there is sufficient space for the lower interlayer weaving arm to pass between layers 2 210 and 3 216 to weave interlayer fibers 224A between layers 4 222 and 3 216.

Following the weaving of interlayer fibers 224A in phase 223, phase 225 transfers layer 4 222 to the intermediate layer stage 202 and layer 3 216 to the completed layer stage 203. Phase 225 also tightens interlayer fibers 218A to form tightened interlayer fibers 218B and consolidates layers 3 216 and 2 210. This brings layers 3 216 and 2 210 into contact with each other while leaving sufficient space between layers 3 216 and 4 222 to allow for the passage of the lower interlayer weaving arm for weaving additional layers.

The process outlined in phases 205 to 225, and specifically phases 221-225, may be repeated for further layers, allowing a fiber preform to be constructed from any number of fiber layers.

Figure 7A:
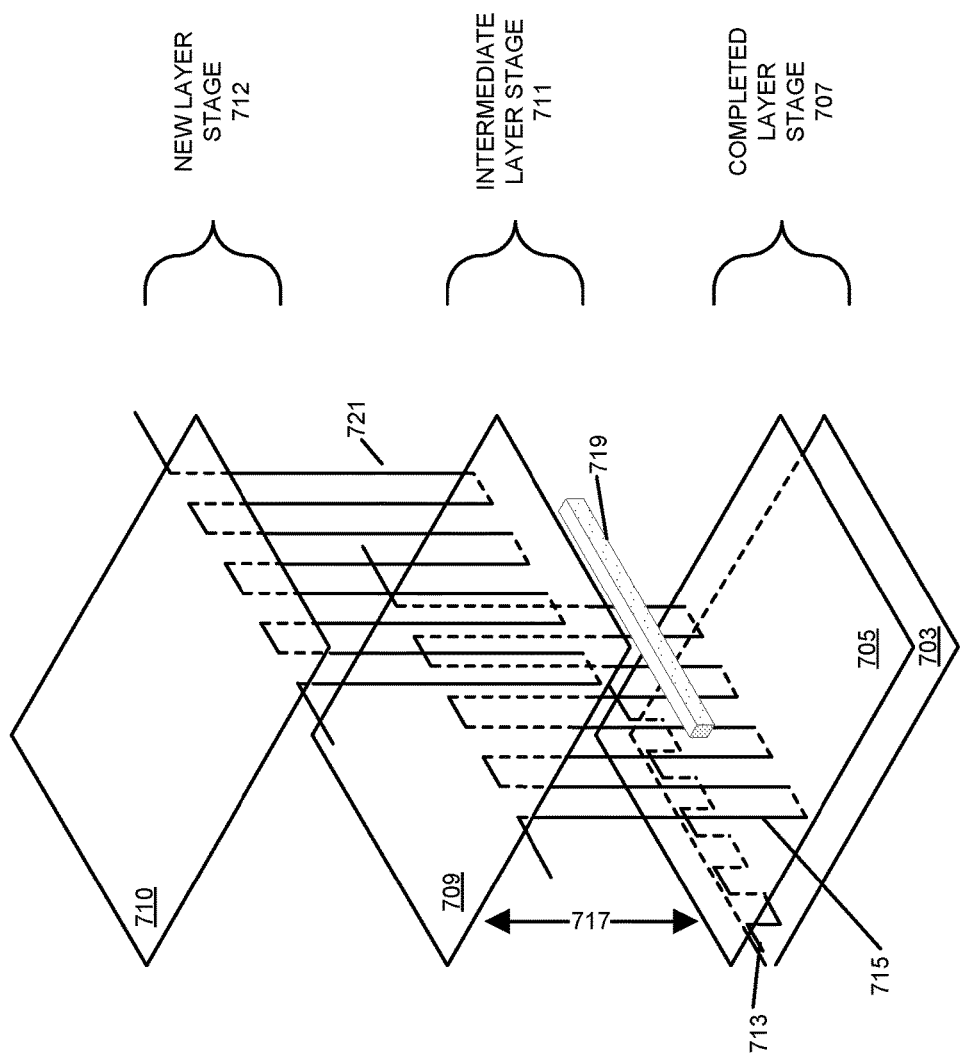
FIGS. 7A-7B illustrate example staggered arrangements of interlayer fibers according to an embodiment of the invention.
Figure 7B:
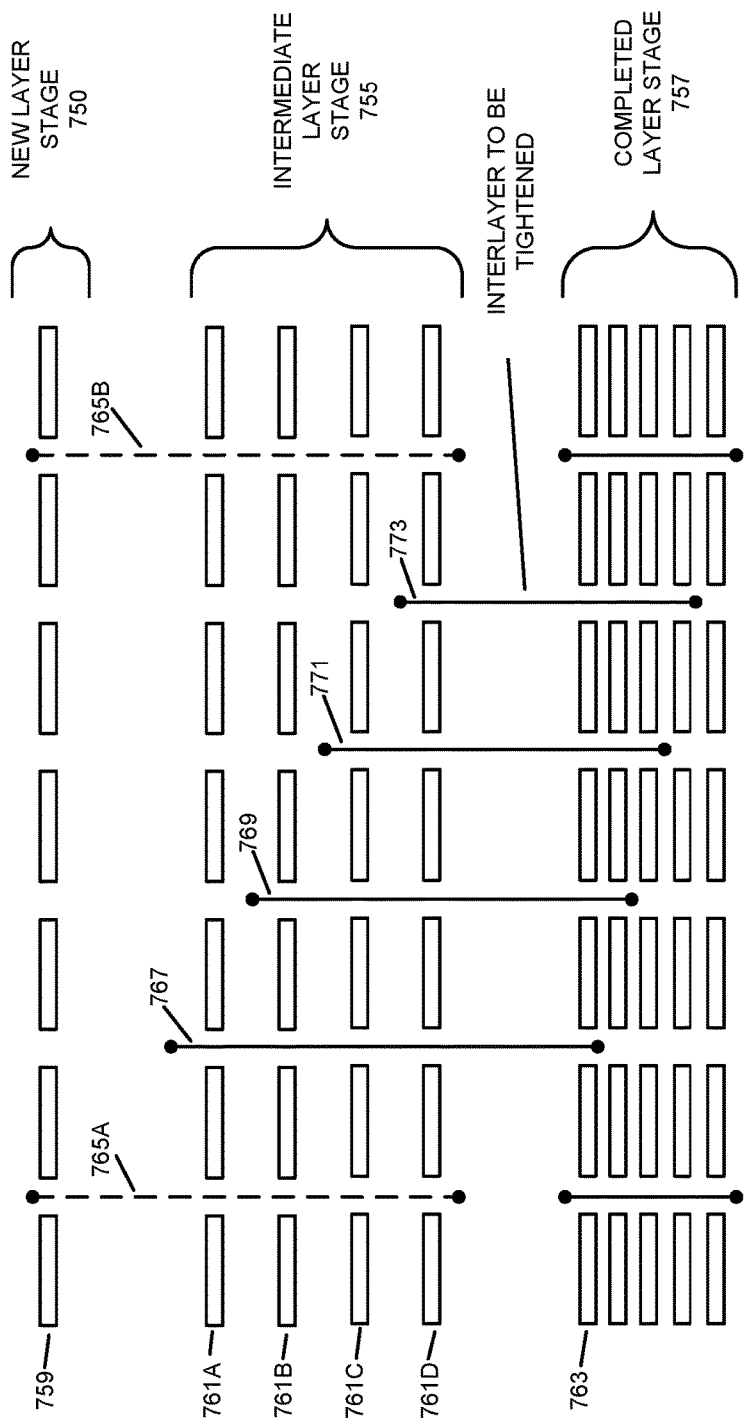

For clarity, example 200 illustrates an intermediate layer stage 202 holding a single layer at a time. In this example, the interlayer fibers only pass through the new layer and a single intermediate layer. However, further embodiments of the invention may hold multiple layers in the intermediate layer stage 202 at the same time. In these embodiments, the interlayer fibers are woven between the new layer and all of the layers in the intermediate layer stage. FIG. 7B illustrate an example arrangement of interlayer fibers passing through multiple intermediate layers. In general, if the intermediate layer stage 202 is able to hold K layers simultaneously, where K is any arbitrary positive integer, then each iteration of an interlayer weaving will pass through the K layers in the intermediate layer stage and the current new layer. Exceptions to this include the first and last K layers of the preform, where the intermediate layer stage may hold less than K layers.

Figure 3:
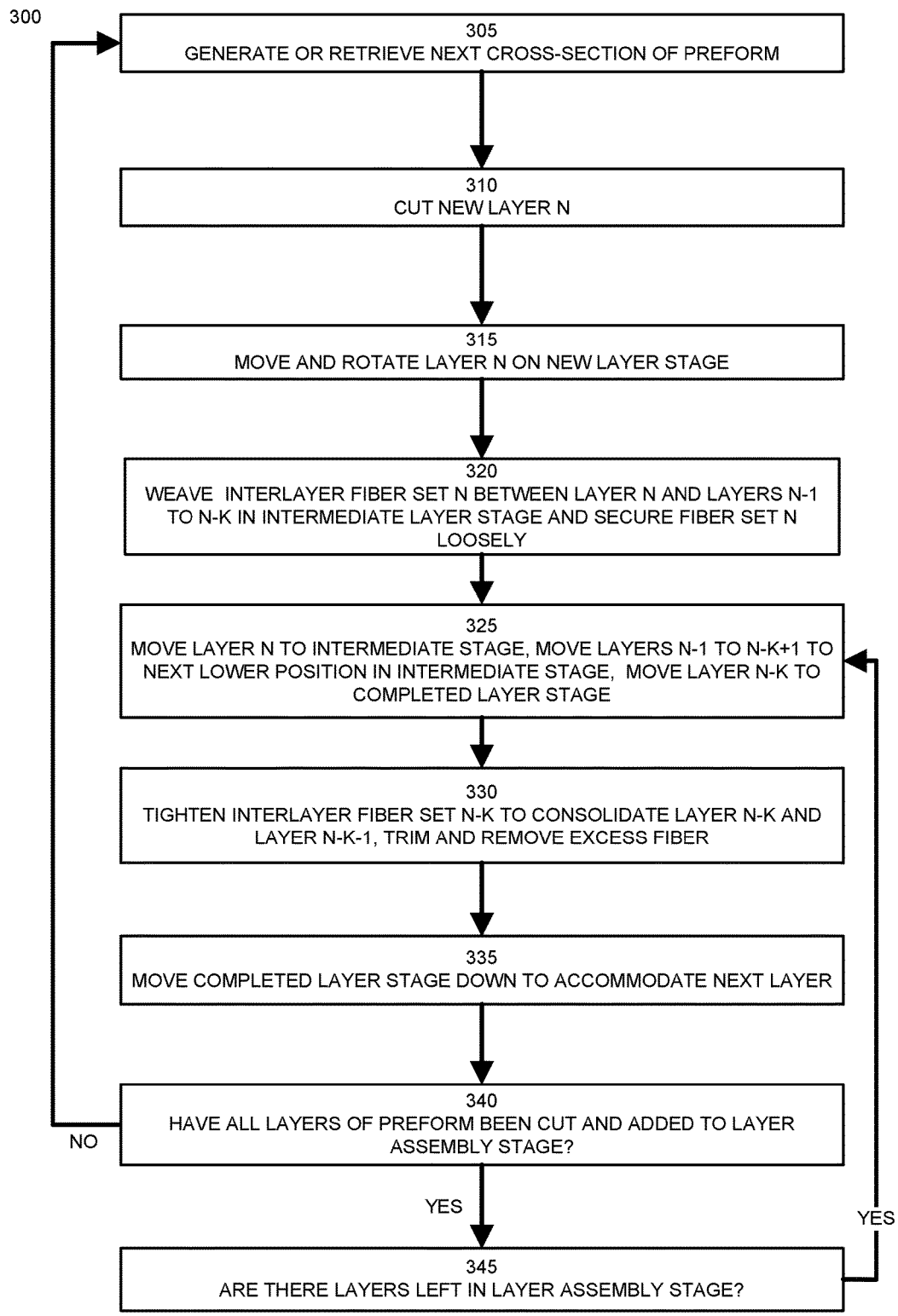
FIG. 3 illustrates a method of three-dimensional weaving of composite preforms and products with varying cross-sectional topology according to an embodiment of the invention.

FIG. 3 illustrates a method 300 of three-dimensional weaving of composite preforms and products with varying cross-sectional topology according to an embodiment of the invention. Method 300 begins with step 305 generating or retrieving the next cross-section of a digital representation of the preform. A digital representation of the preform may be comprised of three-dimensional computer graphics model data in the form of surface data, such as polygon or triangle meshes, higher-order surfaces such as NURBS or subdivision surfaces, or implicit surfaces; or volumetric models, such as voxel, octree, or solid geometry models. In a further embodiment, the digital representation of the preform includes specifications of fiber orientations at various locations of the preform model. These fiber orientations may be specified based on engineering analysis of the applications of the part.

In an embodiment, the digital representation of the preform has already be partitioned into a set of layer specifications. Each layer specification includes a specification of the shape or shapes comprising the preform cross-section at this location. Each layer specification may optionally include a specification of the fiber orientation for this layer and/or the type of material or materials to be used for this layer (if the system has multiple types of materials installed). Step 305 retrieves this data from memory, data storage, or another computer system.

In another embodiment, step 305 generates the cross-section shape of the preform itself directly from the three-dimensional model of the preform using any geometry analysis technique known in the art. For example, Boolean constructive solid geometry operations may be used to generate a cross-section shape from volumetric models and spatial partitioning, such as binary space partitioning trees, may be used to generate a cross-section shape from surface models. If fiber orientations for a specific layer or the entire preform are not specified, step 305 may specify fiber orientations based on heuristics, default patterns, or optimization algorithms using engineering simulations to optimize strength, minimize weight, and/or optimize other factors.

Additionally, if the preform includes disjoint parts or has portions with large, unsupported overhangs, embodiments of step 305 may retrieve or generate specifications for support material, for example using for meltable, soluble, or otherwise easily removable material.

Step 310 cuts a new layer N according to the cross-section shape and fiber orientation specified by step 305. In this discussion of example method 300, each layer is referred to using a sequential integer N. In some embodiments, the fiber orientation of the bulk fiber material with respect to the cutting area cannot be changed. To compensate for this, the specification of cross-section shape is rotated prior to cutting, such that the desired fiber orientation relative to the cross-section shape is achieved. Additionally, if the bulk fiber includes gaps or holes to accommodate the insertion of interlayer fibers, then step 310 may also translate the cross-section shape such that the holes in this layer will be aligned with those of previously cut layers already in the layer assembly stage.

Step 315 transports the cut cross-section shapes of one or more materials to the new layer stage in the layer assembly stage. In an embodiment, step 315 rotates and translates the cut cross-section shapes of this layer so that they are aligned with respect to any previously cut layers in the intermediate layer stage of the layer assembly stage.

Step 320 weaves interlayer fiber set Q between layer N and from 1 to K layers in the intermediate layer stage, where K is the maximum number of layers that may be held in the intermediate layer stage and Q is generally equal to N−1. In an embodiment, interlayer fibers are inserted only in portions of the preform where the new layer N overlaps vertically with all of the layers N−1 to N−K in the intermediate layer stage.

As illustrated in FIG. 2, the system is initialized with an empty intermediate layer stage. In these types of situations, step 320 may be skipped. Once at least one layer is added to the intermediate layer stage, step 320 will weave interlayer fibers between the new layer N and the one or more layers in the intermediate layer stage. Once an initial run of K layers have been created, the intermediate layer stage will include K layers, and step 320 will weave interlayer fibers between the new layer N and the K layers in the intermediate layer stage, which are layers N−1 to layers N−K. The new interlayer fiber set Q is not pulled taut at this time to leave space between the layers for the passage of the lower interlayer weaving arm on subsequent interlayer weaving steps. In an embodiment, the ends of the interlayer fibers are temporarily secured for future access and tightening.

Step 325 moves the new layer N to the top or first position of the intermediate layer stage, moves layer N−K from the bottom or last position of the intermediate layer stage to the completed layer stage, and moves each of the other layers N−1 to N−K+1 in the intermediate layer stage to the next adjacent position in the intermediate layer stage.

Step 330 tightens a previously woven interlayer fiber set Q-K, if it exists, consolidate layers N−K and N−K−1. Layer consolidation is the process of tightening a set of interlayer fibers between two layers to bring these layers into contact and reduce or substantially eliminate the space between these fiber layers. Additionally, embodiments of step 330 may trim and remove excess interlayer fibers that are left over after tightening fiber set Q-K.

Step 335 moves the set of layers in the completed layer stage down or away from the intermediate layer stage so to accommodate the addition of further layers. In an embodiment, the completed layer stage includes a moveable platform for supporting the set of interwoven and completed layers. As construction of the fiber preform progresses, the moveable platform moves away from the intermediate layer stage so that the distance between the most recent completed layer and the intermediate layer stage remains roughly constant.

Step 340 determines if all of the layers of the preform have been cut and added to the layer assembly stage. If not, then method 300 returns to step 305 to process, cut, and add interlayer weaving to another layer of fabric. If all of the layers have been cut and added to the layer assembly stage, then step 345 determines if there are any layers in the intermediate layer stage left to process. If so, then method 300 proceeds back to step 325 to process additional layers in the intermediate layer stage. If step 345 determines that there are no more layers in the intermediate layer stage, then method 300 is complete.

Although the steps of method 300 are shown sequentially for clarity, embodiments of the invention may perform some or all of these steps in parallel. For example, an iteration of steps 305 and 310 for a layer N+1 may be performed in parallel with interlayer weaving process of layer N in steps 315 to 335. In further embodiments, multiple layer cutting stages M may perform steps 305 and 310 in parallel to cut multiple layers simultaneously. Cut layers are transported from their respective cutting stages to the layer assembly stage in the order of assembly.

In a further embodiment, step 310 may also cut layers of non-fiber material, such as removable support material or materials with other properties, for inclusion with the fiber preform. Support material may be used to support portions of the fiber preform with large overhangs, relative to the layers underneath this portion of the preform. In an additional embodiment, fiber preforms may also be constructed with two or more disjoint parts, optionally held in place through one or more layers of removable (for example meltable or soluble) support material. Each of the disjoint parts has its own layers connected with interlayer fibers, but there are no interlayer fibers connecting the disjoint parts.

An embodiment of the invention includes layers of non-fiber material, such as support material, in the fiber preform without having interlayer fibers cross open spaces between non-adjacent layers. This can be used to create overhangs within a part and separate, unconnected parts within a preform.

To accomplish this, the interlayer weaving process, for example shown in phases 211, 217, and 223 and step 320, is suspended over the portion or portions of the layer assembly area where support layers and/or one or more disjoint parts are to be created after the last fiber layer before a support layer and/or a layer of a second part enters the top or first position of the intermediate layer stage. (The interlayer weaving process can continue in regions of the layer assembly stage where the second part or support layer is not going to be added.) Layers of cross-section shapes comprising one or more support layers, overhanging portions of the preform, and/or a second part are then sequentially added to the new layer stage 201 and moved down through the one or more layer positions of the intermediate layer stage 202 without any interlayer weaving until the first layer of the second part or a fiber layer of an overhanging portion of the preform reaches the bottom of the intermediate layer stage. At this point, interlayer weaving is resumed in this portion of the layer assembly stage 202 so that layers of the second part and/or overhanging portions of the preform begin to be connected with interlayer fibers.

Embodiments of the invention may include intermediate layer stages having K positions, where K is any integer greater than 1. In general, higher values of K allow for each set of interlayer fibers to span larger numbers of fiber layers, which adds strength along this axis. However, larger values of K also increase the size of the intermediate layer stage and limit minimum thickness of any portion of the fiber preform to K layers. In a further embodiment, this limitation on the minimum thickness of the fiber preform may be overcome by allowing the intermediate layer stage to hold a variable number of fiber layers from 1 to K layers. For thin portions of the fiber preform, the number of fiber layers in the intermediate layer stage is reduces to K', where K' is less than or equal to the thickness of a portion of the fiber preform. When the thickness of the fiber preform increases, K' may be increased up to the maximum value of K to add strength to the preform.

Figure 4:
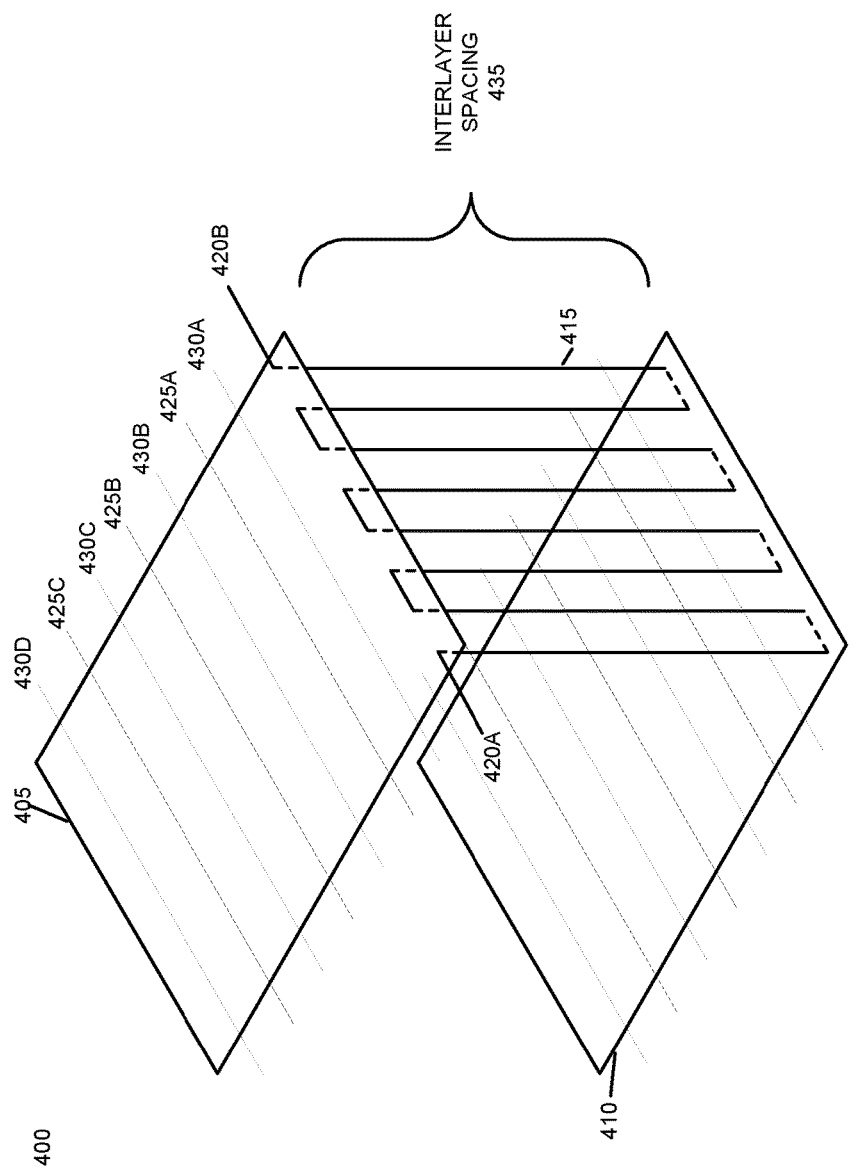
FIG. 4 illustrates an example weaving pattern of interlayer fibers for connecting two or more two-dimensional layers of fibers to form a three-dimensional weave according to an embodiment of the invention.

As described above, interlayer fibers are used to connect layers of fabric cut to cross-section shapes of a fiber preform. These interlayer fibers are not tightened at first to allow for the insertion of additional sets of interlayer fibers between subsequently added layers. FIG. 4 illustrates an example 400 of a weaving pattern of interlayer fibers for connecting two or more two-dimensional layers of fibers to form a three-dimensional weave according to an embodiment of the invention.

In example 400, a new layer 405 is to be connected with one or more previously added layers 410 in positioned in an intermediate layer stage. Interlayer fiber 415 is used to connect layers 405 and 410. As shown in example 400, interlayer fiber is woven from the top surface of new layer 405 to the bottom surface of layer 410, which would be at the bottom or last position of the intermediate layer stage. For clarity, the interlayer weaving arms passing over the top surface of layer 405 and under the bottom surface of layer 410 are omitted from this drawing.

After weaving interlayer fiber 415, the ends 420A and 420B are secured, but not tightened. This leaves a space 435 between the layers 405 and 410, which will later be used to accommodate the passage of the lower interlayer weaving arm when layer 405 is at the bottom position of the intermediate layer stage. After the insertion of this subsequent interlayer fiber set, the ends 420A and 420B of the interlayer fiber 415 will be used to tighten the interlayer fiber 415 and remove the space 435 between layers 405 and 410.

In an embodiment, interlayer fibers such as interlayer fiber 415 are inserted in regularly spaced rows or columns. Interlayer fibers are inserted only in portions of the preform where the new layer overlaps vertically with all of the layers in the intermediate layer stage. Additionally, each interlayer weaving stage inserts interlayer fibers in only some of the available rows or columns. For example, a weaving phase may insert interlayer fiber 415 and additional interlayer fibers in alternate rows 425A-425C, skipping rows 430A-430D. The omitted rows will be used for interlayer fibers inserted during later weaving phases. FIG. 7B, discussed below, illustrates an example staggered arrangement of interlayer fibers produced by skipping a portion of the rows during each interlayer weaving phase.

Figure 5C:
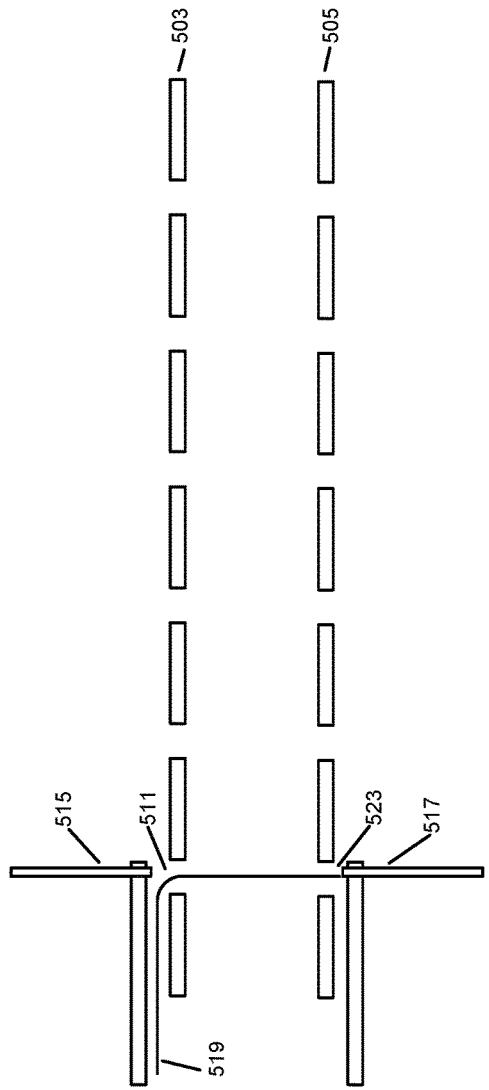

FIGS. 5A-5G illustrates the operation of an example mechanism for connecting two or more two-dimensional layers of fibers with an interlayer fibers to form a three-dimensional weave according to an embodiment of the invention. FIG. 5A illustrates a pair of fabric layers 503 and 505. In an embodiment, layer 503 is a new layer added to the layer assembly stage and layer 505 is at the bottom position of the intermediate layer stage.

Although FIGS. 5A-5G only show a pair of layers for clarity, additional layers may be optionally included between layers 503 and 505 if the intermediate layer stage holds more than one layer.

A pair of interlayer weaving arms 507 and 509 advance in direction 513 until they reach first openings 511 and 523 in the fiber layers. In an embodiment, layers 503 and 505 are cut and positioned in the layer assembly stage so that their gaps are aligned. A variety of techniques may be used to precisely position the interlayer weaving arms 507 and 509 with respect to openings 511 and 523. In one embodiment, layers are positioned in the intermediate layer stage so that the openings of fibers are at predetermined positions. Open loop control systems, such as stepper motors controlled by dead-reckoning, may be used to move the interlayer weaving arms to the predetermined position of openings 511 and 523.

In another embodiment, closed loop control systems may be used to move the interlayer weaving arms to predetermined or dynamically determined opening positions. Closed loop system may incorporate position sensors of any type known in the art, including both linear and rotary position and/or distance sensors. Further embodiments of the closed loop control system may include sensors for detecting openings in the fabric layers. Examples of sensors include cameras and computer vision systems and/or lasers and photodetectors mounted on opposite interlayer weaving arms to detect openings in the fabric. In still further embodiments of the invention, there may be markings or other indicators printed on or incorporated within the fabric itself to assist sensors in aligning layers of fabric and locating openings in fabric layers. In yet a further embodiment, conductive and/or magnetic fibers may be included in the fabric layer at known positions relative to the fabric openings and sensed using capacitive, inductive, and/or magnetic sensing techniques.

Continuing this example in FIG. 5B, after aligning the interlayer weaving arms with openings 511 and 523, a pair of rapiers or hollow needles 515 and 517 are extended from their respective weaving arms through the openings 511 and 523. The rapiers 515 and 517 come in contact or close proximity at location 521 between the layers 503 and 505. Rapier 515 pulls a fiber or set of fibers (such as a flat ribbon or tow of fibers) 519 from a spool or bobbin over the top surface of layer 503 and through opening 511 to location 521. At location 521, rapier 517 grips fiber 519 and rapier 515 releases fiber 519. Fibers may be gripped and released using vacuum tools, mechanical grippers, or any other type of fiber handling mechanism known in the art. In a further embodiment, the end of fiber 519 includes magnetic covering so that rapiers 515 and 517 may attach and detach the fiber using electromagnets.

Continuing this example in FIG. 5C, rapiers 515 and 517 are retracted through openings 511 and 523, respectively. During this retraction, rapier 517 pulls fiber 519 through opening 523 so that it is under the bottom surface of layer 505. Additional fiber from a spool is released to accommodate the movement of fiber 519.

Figure 5D:
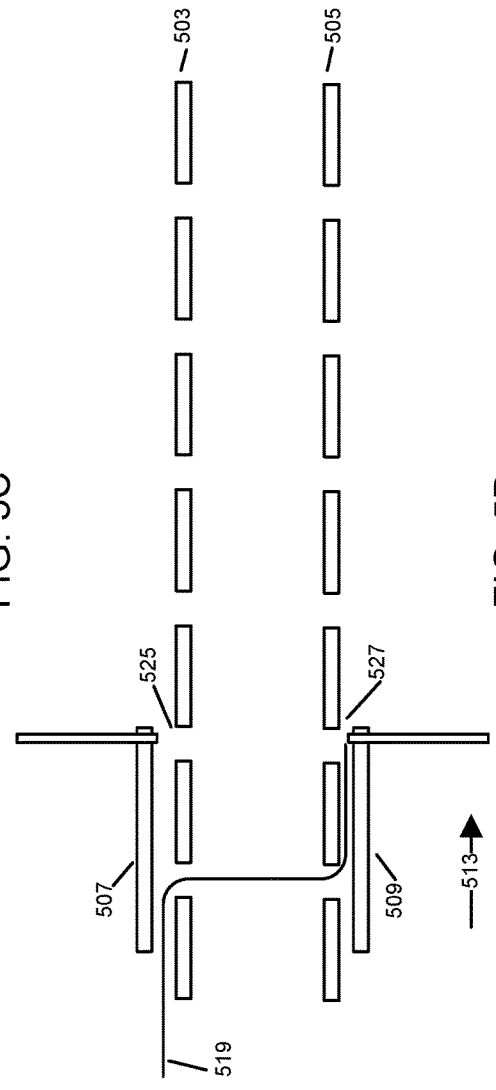

Continuing this example in FIG. 5D, interlayer weaving arms 507 and 509 move in direction 513 along the top surface of layer 503 and the bottom surface of layer 505, respectively, to the next openings in the fiber layers, 525 and 527. This movement pulls fiber 519 along the bottom surface of layer 505 to opening 527.

Figure 5E:
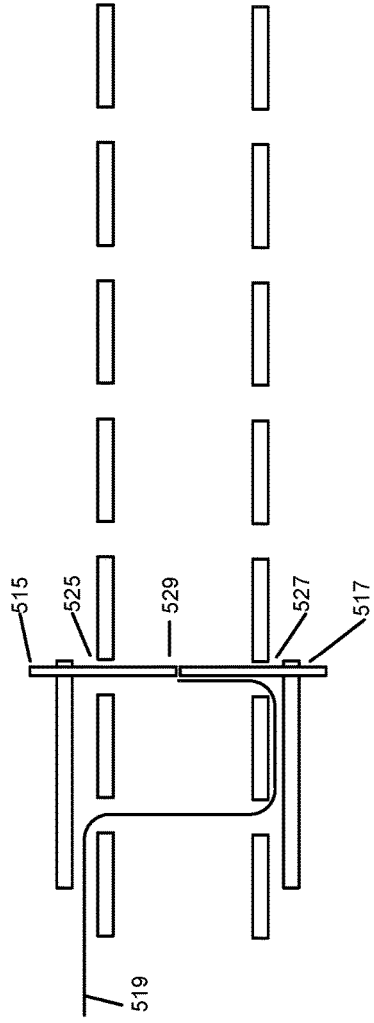

Continuing this example in FIG. 5E, after aligning the interlayer weaving arms with openings 525 and 527, the rapier arms 515 and 517 are again extended from their respective weaving arms through the openings 525 and 527 to location 529. This pulls fiber 519 through opening 527 to location 529. At location 529, rapier 515 grips fiber 519 and rapier 517 releases fiber 519.

Figure 5F:
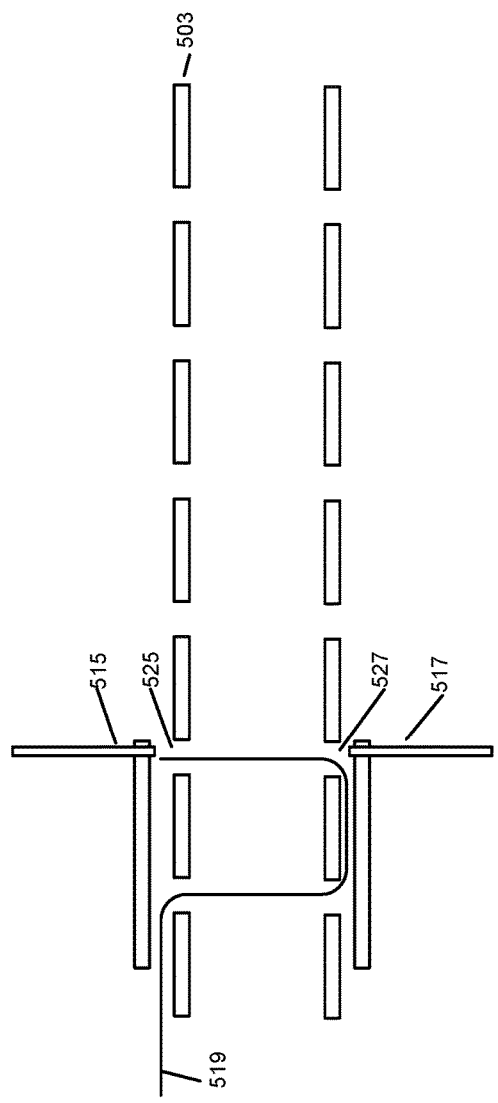

Continuing this example in FIG. 5F, rapiers 515 and 517 are retracted through openings 525 and 527, respectively. During this retraction, rapier 517 pulls fiber 519 through opening 525 so that it is over the top surface of layer 503. Additional fiber from a spool is released to accommodate the movement of fiber 519.

Figure 5G:
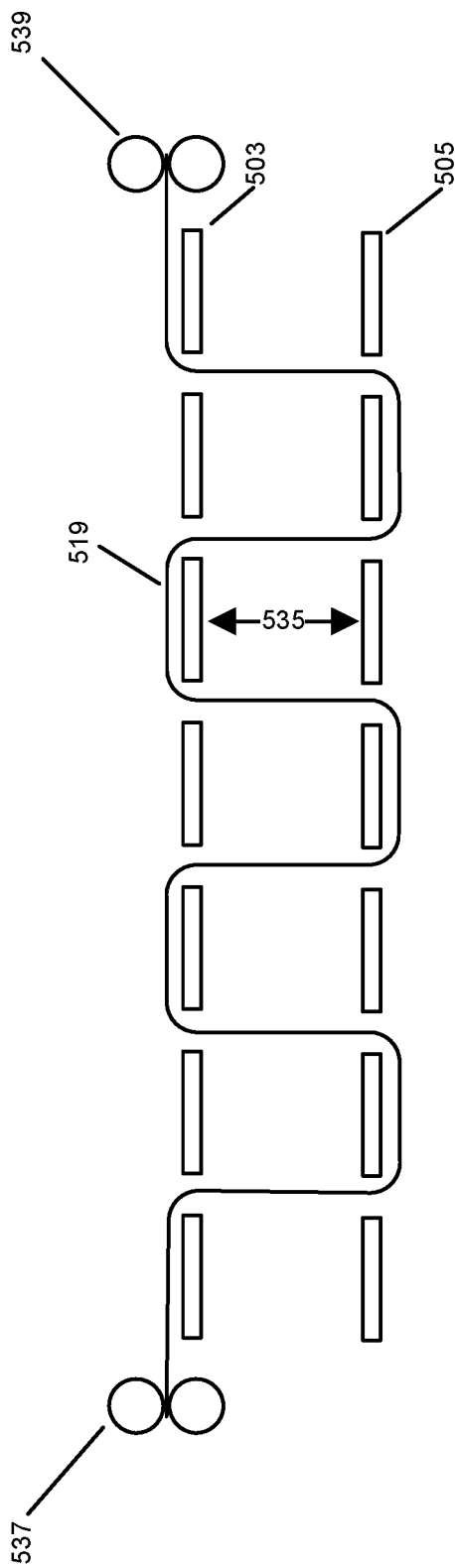

The process shown in FIGS. 5A-5F is repeated for the remaining openings in these rows of fabric layers 503 and 505 where the new layer 503 overlaps vertically with layer 505 and all the other layers, if any, in the intermediate layer stage. FIG. 5G illustrates an example of a completed row of interlayer weaving. Fiber 519 passes through a set of openings in a row of fabric layers 503 and 505. However, a space 535 is left between the fabric layers 503 and 505 to allow for the passage of a lower interlayer weaving arm in a subsequent weaving phase. The ends of fiber 519 are secured in grippers 537 and 539, so that the fiber 519 may be pulled taut later to place layers 503 and 505 in contact and eliminate space 535.

The above example shows a pair of interlayer weaving arms weaving a fiber between two (or potentially more) layers. After completing the weaving of this row, the pair of interlayer weaving arms may be retracted and moved to a different row of fabric openings to weave another fiber. This process may be repeated for a portion of the rows of a layer, with some rows of openings typically left open for the weaving of interlayer fibers in subsequent weaving phases between additional layers. In a further embodiment, the system may include multiple pairs of weaving arms operating in parallel to reduce the time required to perform interlayer weaving over multiple rows of openings.

FIGS. 6A-6C illustrate the operation of an example mechanism for consolidating two or more layers of a three-dimensional weave according to an embodiment of the invention. Layer consolidation is the process of tightening a set of interlayer fibers between two layers to bring these layers into contact and reduce or substantially eliminate the space between these fiber layers.

FIG. 6A illustrates a pair of layers 603 and 605 connected with interlayer fiber 607. Interlayer fiber 607 (as well as similar interlayer fibers in other rows of layers 603 and 605) is secured with grippers 611 and 613. A space 609 has been left between layers 603 and 605 to allow for the passage of a lower interlayer weaving arm during the weaving of layer 603 with one or more layers above it using a different row of openings in layer 603. Once the weaving of layer 603 with one or more layers above has been completed, layers 603 and 605 may be consolidated to eliminate space 609.

FIG. 6B illustrates an example of the layer consolidation process. In an embodiment, grippers 611 and 613 are pulled laterally to apply tension to interlayer fiber 607. This tension takes of the slack space between layers 603 and 605, bringing these two layers into contact and substantially eliminating the space 609 that existed between them. In a further embodiment, interlayer fibers and/or layer fabric may include a coating or lubricant to allow this tightening to occur without binding.

After the layers 603 and 605 have been brought together, a further embodiment of the invention cuts and removes the excess interlayer fiber 615 and 617, resulting in the layers 603 and 605 and interlayer fiber 607 as shown in FIG. 6C.

In a further embodiments, the interlayer weaving arms may insert interlayer fibers using other weaving patterns, such as satin weaves and twill weaves. In still further embodiments, alternative forms of fiber connections may be used to connect layers with interlayer fibers, such as sewing (for example using a lock stitch, chain stitch, or overlock stitch). Embodiments of the invention may be used with any type of fiber connections provided that the connection can be held open to allow for a space between layers and then later tightened to reduce or eliminate this space.

As discussed above, embodiments of the invention skip rows of openings when weaving interlayer fibers between layers. FIGS. 7A-7B illustrate example staggered arrangements of interlayer fibers according to an embodiment of the invention. FIG. 7A illustrates an example 700 of staggered interlayer fibers according to an embodiment of the invention. Example 700 includes a pair of consolidated layers 703 and 705 in the completed layer stage 707, at least one layer 709 in the intermediate layer stage 711, and a new layer 710 in the new layer stage 712.

Consolidated layers 703 and 705 are connected with interlayer fiber 713, which has been tightened to remove the spacing between these layers. Additionally, interlayer fiber 715 connects layer 705 and 709. Interlayer fiber 715 has not been tightened yet, leaving a large space 717 between layers 705 and 709. Space 717 is sufficient for allowing a lower interlayer weaving arm 719 to pass between layers 705 and 709. Interlayer weaving arm 719 is used to weave interlayer fiber 721 between layers 709 and 710, as well as any intervening layers. After the weaving of interlayer fiber 721 and other fibers between layers 709 and 710 is complete, layer 709 may be moved to the completed layer stage and consolidated with layer 705 by tightening interlayer fibers 715.

As shown in example 700, each weaving phase may insert interlayer fibers in only a portion of the available rows of openings in the layer fabrics to allow each layer to be connected with layers above and below it using interlayer fibers. For example, if the intermediate layer stage only holds a single layer, then weaving interlayer fibers in alternate rows of openings, as shown in FIG. 4, may be suitable for connecting each layer with those layers above and below it. In FIG. 7A, if each weaving phase uses ⅓ of the available row openings, then the intermediate layer stage may hold up to two layers. In this example 700, each layer is connected with the two layers below it.

FIG. 7B illustrates another example 750 of a staggered interlayer fiber arrangement. In example 750, new layer stage 753 includes layer 759. Intermediate layer stage 755 includes four layers, layers 761A-761D. Completed layer stage 757 may include any number of layers, including in this example layer 763.

In example 750, because there are four layers in the intermediate layer stage 755, interlayer fibers are woven into each new layer at every fifth row of openings. In a general implementation of this embodiment, if there are K layers in an intermediate layer stage, then interlayer fibers are added to each new layer at every K+1 row of openings. To this end, interlayer fibers 765A and 765B are woven between new layer 759 and layer 761D, passing through unused openings in layers 761A-761C as well.

As new layer 759 progresses through intermediate layer stage 755, its unused rows of openings will be gradually filled by interlayer fibers connecting with subsequent layers. For example, layer 761A in the first position of the intermediate layer stage 755 has interlayer fibers in two of every five adjacent rows of openings: such as interlayer fibers 765A and 767. Layer 761B in the second position of the intermediate layer stage 755 has interlayer fibers in three of every five adjacent rows of openings: such as interlayer fibers 765A, 767, and 769. Layer 761C in the third position of the intermediate layer stage 755 has interlayer fibers in four of every five adjacent rows of openings: such as interlayer fibers 765A, 767, 769, and 771. Layer 761D in the fourth position of the intermediate layer stage 755 has interlayer fibers in all five of every five adjacent rows of openings: such as interlayer fibers 765A, 767, 769, and 773.

Following the addition of interlayer fibers 765A and 765B, all of the rows of openings in layer 761D are now occupied by interlayer fibers (at least for those openings that vertically overlap with the layers above it). Thus, layer 761D is ready for consolidation with layer 763 and interlayer fibers such as 773 may be tightened to eliminate the space between these two layers.

As shown in this example 750, by weaving interlayer fibers in every K+1 row of a new layer when the intermediate layer stage has K layers, all of the rows of openings of each layer are occupied with interlayer fibers by the time this new layer progresses through the intermediate layer stage. For each new layer added, the relative phase or offset of the interlayer fiber pattern is changed, but the K+1 interval between rows of interlayer fibers added remains unchanged. In this implementation, interlayer fibers each typically connect K+1 layers.

In an embodiment illustrated by example 750, interlayer fibers are woven in regular K+1 intervals. However, further embodiments may use other patterns for distributing interlayer fibers, including stochastic patterns of interlayer fibers with statistical distributions corresponding to an average interval of K+1 rows.

As described above, interlayer fibers are woven through openings of two or more layers. FIGS. 8A-8C illustrate example open weave fabric patterns suitable for use with embodiments of the invention. FIG. 8A illustrates an example open plain weave pattern 800. Unlike typical plain weaves where the warp and weft fibers are arranged in close contact with each other, open plain weave pattern 800 includes numerous openings suitable for allowing passage of interlayer fibers, such as openings 805A-805I.

FIG. 8B illustrates an open satin weave pattern 820. Satin weaves typically have higher strength than plain weaves because the warp fibers are not bent or crimped in every row of the weave. Example open satin weave pattern 820 is referred to as a four thread satin weave; however, embodiments of the invention may be used with any variation of an open satin weave. Unlike typical satin weaves where the warp and weft fibers are arranged in close contact with each other, open satin weave pattern 820 includes numerous openings suitable for allowing passage of interlayer fibers, such as openings 825A-825L.

FIG. 8C illustrates an open leno weave pattern 840. Many open weave patterns allow warp fibers to move positions easily, which can lead to uneven distributions of fibers, referred to as bruising. Leno weave patterns prevent this by twisting warp fibers after one or more weft fibers have been inserted. The twisted warp fibers hold the weft fibers in place while still leaving large spaces between the fibers, such as spaces 841A-841I.

The open leno weave pattern 840 includes large primary fibers 843A-843D. Primary fibers are intended to provide high tensile strength along their axes. The leno weave pattern 840 also includes twisted secondary fibers 845A-845D intended to hold primary fibers 843 in place. The secondary fibers may be made of the same material as the primary fibers or a different material, such as a less expensive material. When manufactured using traditional weaving processes, the primary fibers 843 will often be weft fibers and the secondary fibers 845 will be warp fibers.

FIG. 8C illustrates a basic leno weave pattern 840. However, further embodiments of the invention may use more complicated leno weaves, such as leno weave patterns where the warp fibers are twisted only after multiple weft fibers have been inserted. In another example, Karamiori or Japanese leno weave patterns may be used to place and hold primary fibers in wide variety of different distributions. Normally, such patterns are used for aesthetic purposes; however, embodiments of the invention may use these patterns to increase or decrease the spacing between primary fibers.

The preceding weave patterns are shown for purposes of illustration and embodiments of the invention may use these and/or any other open fabric patterns known in the art, such as twill weaves, basket weaves, unidirectional weaves, bonded directional weaves, and non-woven fabrics, where fibers or tows are bonded instead of woven together. Additionally, secondary or filling fibers may be included in fabrics to provide support during the weaving process. In a further embodiment, secondary fibers may be adapted to melt, dissolve, or burn away during the curing process.

Figure 9A:
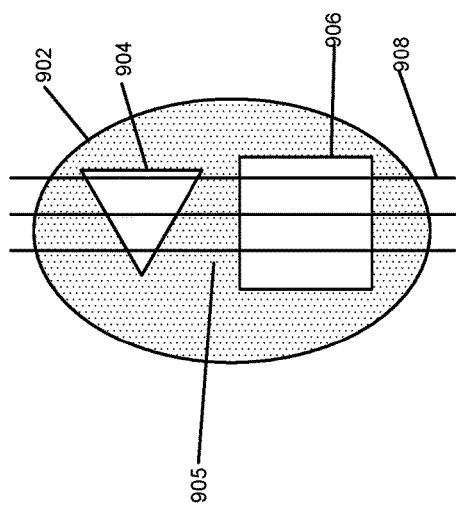
FIGS. 9A-9E illustrate an example removal of excess interlayer fibers during the consolidation of non-convex layers according to an embodiment of the invention.

As discussed above, following the consolidation of two or more layers, excess interlayer fibers may be cut and removed from the fiber preform. FIGS. 9A-9E illustrate an example removal of excess interlayer fibers during the consolidation of non-convex layers according to an embodiment of the invention. FIG. 9A illustrates an example top view 900 of two layers: a lower layer 902 and an upper layer comprised of two disjoint shapes 904 and 906. Prior to layer consolidation, interlayer fibers 908 pass over the upper layer, including the empty region 905 between shapes 904 and 906.

Figure 9B:
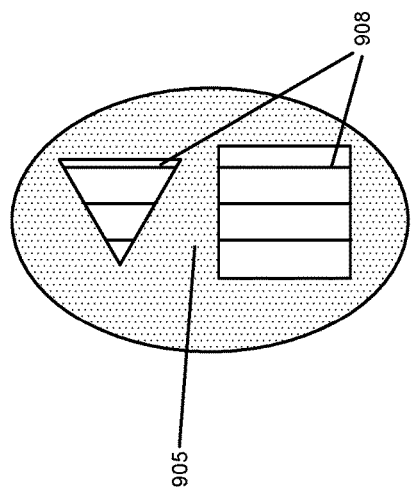

FIG. 9B illustrates an example top view 910 of the two layers following layer consolidation. The interlayer fibers 908 have been trimmed so that they no longer cross gap 905.

Figure 9C:
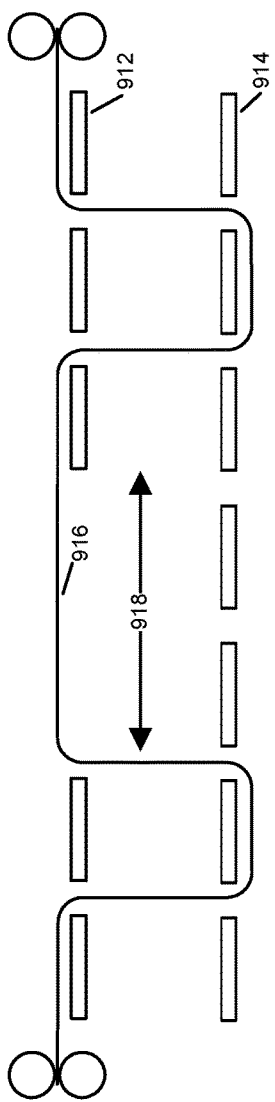
Figure 9D:
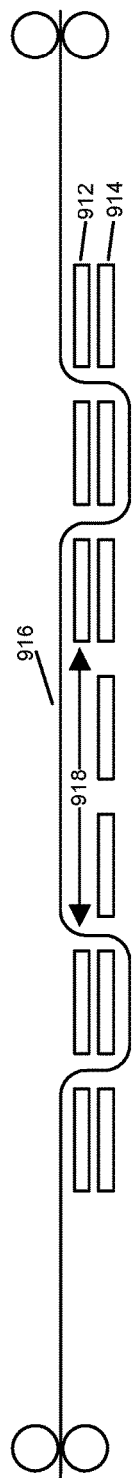
Figure 9E:
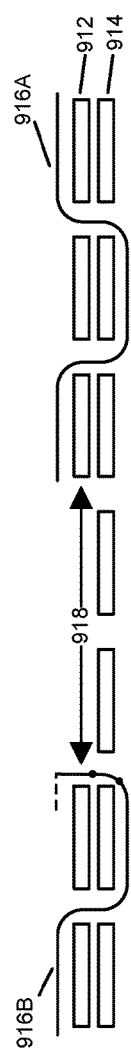

FIGS. 9C-9E illustrate a detailed side view of the trimming of excess fibers during layer consolidation. In FIG. 9C, layers 912 and 914 are connected with an interlayer fiber 916. Layer 912 includes two disjoint portions, separated by a gap 918. Before layer consolidation, this gap 918 is spanned by the interlayer fiber 916.

In FIG. 9D, the interlayer fiber 916 has been tightened to bring layers 912 and 914 into contact. However, gap 918 is still spanned by the interlayer fiber 916.

In FIG. 9E, interlayer fiber 916 has been cut into pieces 916A and 916B, and the excess portion of the interlayer fiber 916 has been removed from the gap 918. In a further embodiment, excess fiber at the ends of pieces 916A and/or 916B may be folded over or under layer 912.

As described above, layers of cut fabric cross-section shapes are moved through the layer assembly stage during interlayer weaving. One mechanism to accomplish this movement is through sets of pins, with each set forming a shelf to support a layer and having openings to accommodate the passage of interlayer fibers. Each set of pins moves down through the positions of the new layer and intermediate layer stages As layer consolidation is performed, the pins retract to the side to allow the layers to contact.

Figure 10D:
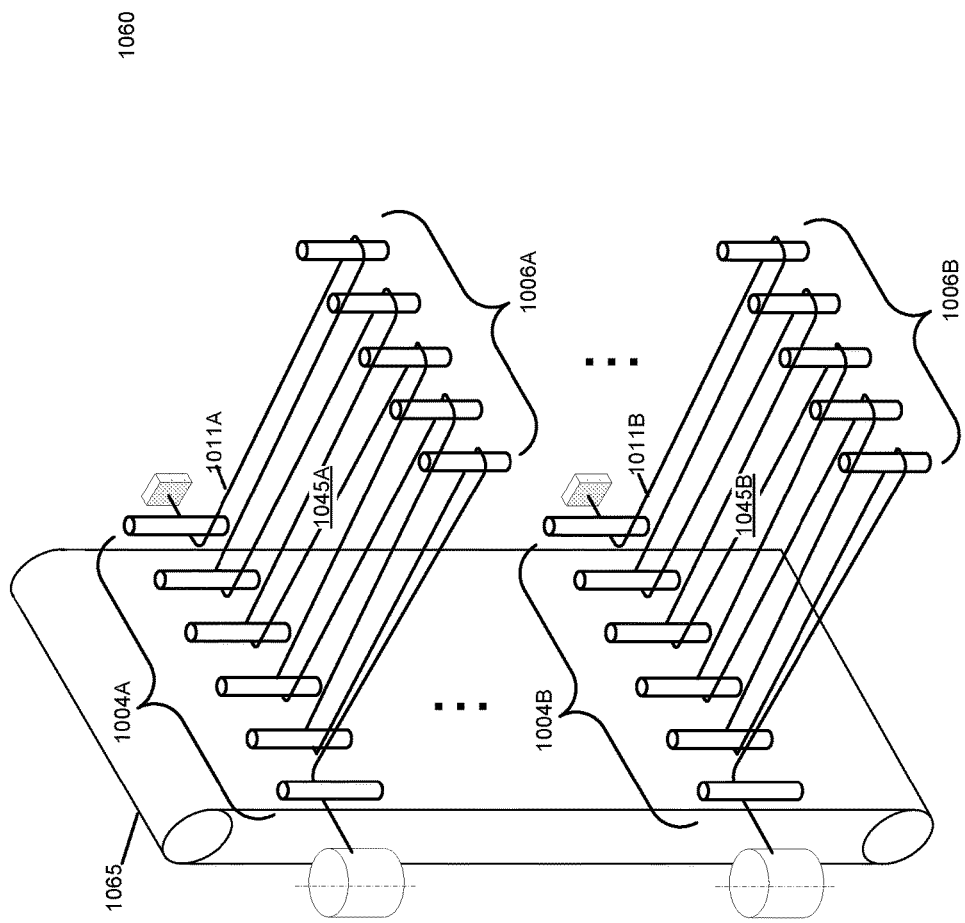

FIGS. 10A-10D illustrate another example mechanism for supporting and moving layers of fabric during three-dimensional weaving according to an embodiment of the invention. FIG. 10A illustrates an example mechanism in an initial configuration 1000. The example mechanism includes end pieces 1003 and 1005. Each of the end pieces 1003 and 1005 includes a set of vertical supports, such as supports 1004 and 1006, respectively. End piece 1005 is connected with sliding rails 1007A and 1007B, which allow end piece 1005 to move to the opposite side of end piece 1003. The vertical supports 1004 and 1006 are offset from each other to allow end pieces 1003 and 1006 to pass by each other. Example mechanism also includes a spool 1009 of high strength fiber, such as nylon fiber, which will be used to form a supporting shelf for a fiber layer in the layer assembly stage.

FIG. 10B illustrates the example mechanism in a second configuration 1020. In this configuration, the end piece 1005 has moved along sliding rails 1007A and 1007B to the opposite side of end piece 1003. Following this movement, a fiber anchor 1013 draws a fiber 1011 from the spool 1009 across the width of end pieces 1003 and 1005. Fiber 1011 is surrounded on either side by the vertical supports 1004 and 1006.

FIG. 10C illustrates the example mechanism in a third configuration 1040. In this configuration, the end piece 1005 has moved along sliding rails 1007A and 1007B back to the opposite side of end piece 1003. In doing so, the vertical supports 1006 of end piece 1005 have drawn additional amounts of fiber 1011 from spool 1009. Fiber 1011 is held taut using a tension mechanism included in spool 1009 and/or fiber anchor 1013 and forms a shelf 1045 for supporting a fabric layer.

The end pieces 1003 and 1004 may move vertically through the layer assembly stage to move shelf 1045 and the fabric layer that it supports to different positions of this stage. During layer consolidation, fiber 1011 may be released from anchor 1013 and pulled back on to spool 1009. This causes shelf 1045 to disappear and lets the previously supported fabric layer contact the layer below it.

FIG. 10D illustrates an example mechanism 1060 for moving retractable fiber support shelves, as described in FIGS. 10A-10C, vertically through a layer assembly stage. according to an embodiment of the invention. In this example 1060, each set of vertical supports can be detached from its respective end piece and attached to a vertically moving chain or conveyor belt in a continuous loop, such as conveyor belt loop 1065. For example, each of the sets of vertical supports, such as supports 1004A and 1004B, are attached to conveyor belt loop 1065, which moves vertically through the layer assembly stage. (The conveyor belt loop for supports 1006A and 1006B has been omitted from FIG. 10B for clarity.) Supports may be attached and detached from end pieces and conveyor belt loops using hooks, latches, magnets, and/or other attachment mechanisms. The conveyor belt loops move in unison through the layer assembly stage, pulling shelves 1045A and 1045B via their respective supports 1004A and 1006A and 1004B and 1006A. At the bottom of the layer assembly stage, each of the shelves may be retracted by releasing the associated fiber from its anchor and pulling it back on to its spool.

Figure 11:
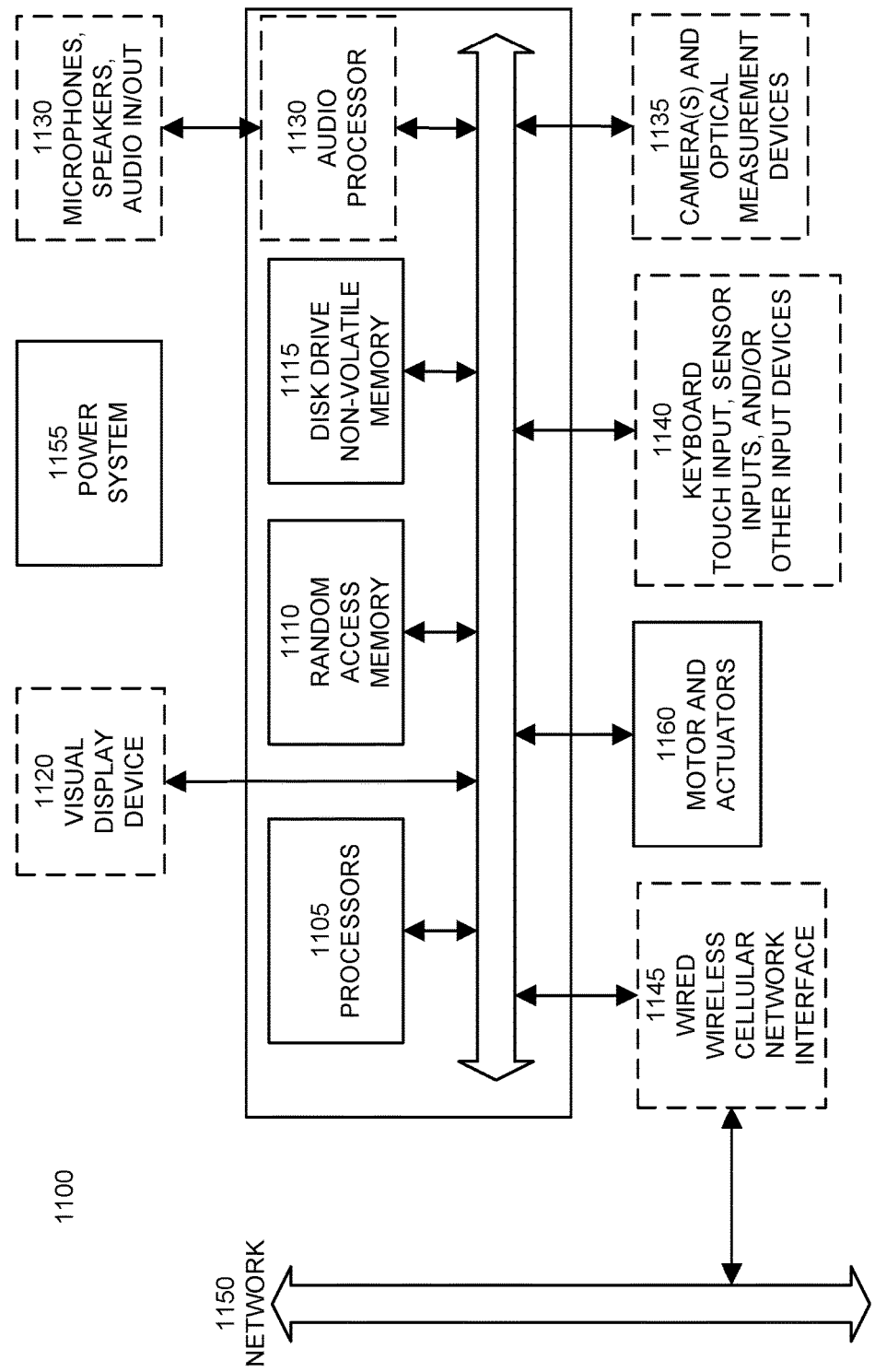
FIG. 11 illustrates a computer system suitable for controlling a system for three-dimensional weaving of composite preforms and products with varying cross-sectional topology according to an embodiment of the invention.

FIG. 11 illustrates a computer system suitable 1100 for controlling a system for three-dimensional weaving of composite preforms and products with varying cross-sectional topology according to an embodiment of the invention. The computer system 1100 includes one or more general purpose or specialized processors 1105, which can include microprocessors, microcontrollers, system on a chip (SoC) devices, digital signal processors, graphics processing units (GPUs), ASICs, and other information processing devices. The computer system 1100 also includes random access memory 1110 and non-volatile memory 1115, such as a magnetic or optical disk drive and/or flash memory devices.

The computer system 1100 may optionally includes one or more visual display devices 1120. The computer system 1100 may also optionally include an audio processor 1125 for generating and receiving sound via speakers, microphone, or other audio inputs and outputs 1130; and optional sensors and input devices 1140 such as keyboards; scroll wheels; buttons; keypads; touch pads, touch screens, and other touch sensors; joysticks and direction pads; motion sensors, such as accelerometers and gyroscopes; global positioning system (GPS) and other location determining sensors; temperature sensors; such as mechanical, optical, magnetic or other types of position detectors and/or limit switches for detecting the current positions of the various components of the above-described systems; voltage, current, resistance, capacitance, inductance, continuity, or any other type of sensor for measuring electrical characteristics of the various components of the above-described systems; force, acceleration, stress or strain, and/or tension sensors; and/or any other type of input device known in the art. Computer system 1100 may optionally include one or more cameras or other optical measurement devices 1135 for capturing still images and/or video.

The computer system 1100 may also include one or more modems and/or wired or wireless network interfaces 1145 (such as the 802.11 family of network standards) for communicating data via local-area networks 1150; wide-area networks such as the Internet; CDMA, GSM, or other cellular data networks of any generation or protocol; industrial networks; or any other standard or proprietary networks. The computer system 1100 can also include a peripheral and/or data transfer interface, such as wired or wireless USB, IEEE 1394 (Firewire), Bluetooth, or other wired or wireless data transfer interfaces.

The computer system 1100 can include a power system 1155 for obtaining electrical power from an external source, such as AC line current or DC power tailored to the computer system 1100 via an external power supply, as well as one or more rechargeable or one-time use batteries, fuel cells, or any other electrical energy generation device. Additionally, power system 1155 may provide energy in the form of compressed gas, vacuum, and/or hydraulic systems to power various actuators and components of embodiments of the invention.

Computer system 1100 may be implemented in a variety of different form factors, including desktop and laptop configurations as well as embedded and headless forms.

Embodiments of the invention use a variety of motors and actuators, such as brushed or brushless DC motors, AC synchronous and induction motors, stepper motors, servo-motors, solenoids, and/or pneumatic and hydraulic actuators. In an embodiment, computer system 1100 include motor and actuator controls 1060 for providing power and control signals to these motors and actuators.

Further embodiments can be envisioned to one of ordinary skill in the art. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for fabricating a fabric structure, the method comprising:
positioning a first fiber support structure on a proximal side of a second fiber support structure;
drawing, from a fiber supply, a first fiber portion between the first and second fiber support structures while the first fiber support structure is on the proximal side;
positioning the first fiber portion on a distal side of the second fiber support structure, thereby drawing, from the fiber supply, an additional fiber portion to form fiber loops between the first and second fiber support structures.

2. The method of claim 1, wherein the first fiber support structure comprises cylindrical supports.

3. The method of claim 2, wherein the second fiber support structure comprises cylindrical support.

4. The method of claim 1, further comprising utilizing a tension mechanism to apply tension to fiber dispensed from the fiber supply.

5. The method of claim 4, wherein the fiber comprises carbon fiber.

6. The method of claim 1, wherein the fiber loops form another fiber structure configured sufficiently untightened to leave a space between the first and second fiber support structures.

7. The method of claim 6, wherein the another fiber structure includes sufficient tension to form a shape corresponding with a fabric layer.

8. The method of claim 3, wherein the cylindrical supports are offset from each other so as to pass each other without interference as the first fiber support structure moves between the proximal and distal sides of the second fiber support structure.

* * * * *